US007406088B2

(12) United States Patent
Magd et al.

(10) Patent No.: US 7,406,088 B2
(45) Date of Patent: Jul. 29, 2008

(54) METHOD AND SYSTEM FOR ETHERNET AND ATM SERVICE INTERWORKING

(75) Inventors: Osama Aboul Magd, Kanata (CA); Sameh Rabie, Kanata (CA); Baghdad Barka, Nepean (CA); Bashar Abdullah, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 631 days.

(21) Appl. No.: 11/011,331

(22) Filed: Dec. 13, 2004

(65) Prior Publication Data

US 2005/0169279 A1 Aug. 4, 2005

Related U.S. Application Data

(60) Provisional application No. 60/537,744, filed on Jan. 20, 2004.

(51) Int. Cl.
*H04B 7/212* (2006.01)
*H04L 12/28* (2006.01)
*H04L 12/56* (2006.01)

(52) U.S. Cl. .................... 370/401; 370/348; 370/395.53

(58) Field of Classification Search ................. 370/348, 370/401, 395.53
See application file for complete search history.

(56) References Cited

U.S. PATENT DOCUMENTS 6,611,522 B1 8/2003 Zheng et al.
6,751,221 B1 * 6/2004 Saito et al. .................. 370/392
6,912,225 B1 6/2005 Kohzuki et al.
7,277,442 B1 * 10/2007 Holmgren et al. ....... 370/395.53
2002/0031142 A1 3/2002 Metin et al.
2002/0136224 A1 9/2002 Motley
2002/0159462 A1 10/2002 Demaria et al.
2002/0176450 A1 11/2002 Kong et al.
2003/0031182 A1 * 2/2003 O'Neil et al. ............ 370/395.1
2003/0053464 A1 3/2003 Chen et al.
2003/0067934 A1 4/2003 Hooper et al.
2003/0076838 A1 4/2003 Shaio et al.
2003/0103503 A1 6/2003 Dubuc et al.

(Continued)

OTHER PUBLICATIONS

Bot, "Key Technical Considerations When Using Ethernet Solutions in Existing ATM and Frame Relay Networks," *JEEE Communications Magazine*, Mar. 2004, pp. 96-102.

(Continued)

*Primary Examiner*—Ronald Abelson
(74) *Attorney, Agent, or Firm*—Christopher & Weisberg, P.A.

(57) ABSTRACT

A method and system for service interworking between an Ethernet communication network and an ATM network, in which a first network interface is operable to communicate with the Ethernet communication network using an Ethernet communication protocol. A second network interface is operable to communicate with the ATM communication network using an ATM protocol. A processing unit is in communication with the first network interface and the second network interface, in which the processing unit terminates frames received from a one of the ATM communication network and the Ethernet communication network and maps parameters corresponding to the received one of the ATM and Ethernet frames into the other of the ATM and Ethernet frames. The mapped parameters include connection configuration control plane information and data plane parameters corresponding to individual frames. The described methods can support single or multiple QoS levels.

28 Claims, 18 Drawing Sheets

U.S. PATENT DOCUMENTS

| | | | | |
|---|---|---|---|---|
| 2003/0118026 | A1 | 6/2003 | Kuhl et al. | |
| 2003/0126286 | A1 | 7/2003 | Lee | |
| 2004/0022255 | A1 | 2/2004 | Chen et al. | |
| 2004/0252717 | A1 | 12/2004 | Solomon et al. | |
| 2005/0141509 | A1* | 6/2005 | Rabie et al. | 370/395.1 |
| 2005/0157729 | A1* | 7/2005 | Rabie et al. | 370/395.53 |
| 2005/0169279 | A1 | 8/2005 | Magd et al. | |

OTHER PUBLICATIONS

Grossman et al, "Multiprotocol Encapsulation over ATM Adaptation Layer 5" (rfc2684), Sep. 1999, entire document. Downloaded from http://www.faqs.org/rfcs/rfc2684.html (Address valid as of Sep. 5, 2006).

* cited by examiner

200

| 204 | 202 ATM Layer Service Category | | | | | |
|---|---|---|---|---|---|---|
| | CBR | rt-VBR | nrt-VBR | UBR/UBR+ | ABR | GFR |
| PCR & CDVT | specified | | | | | |
| SCR, MBS, CDVT | N/A | specified | | N/A | | |
| MDCR/MCR | N/A | | | specified | specified | N/A |
| MCR, MBS, MFS, CDVT | N/A | | | | | specified |
| Peak-to-Peak CDV | specified | unspecified | | | | |
| MaxCTD | specified | unspecified | | | | |
| CLR | specified | | | Network specific | Network specific | Network specific |

Traffic Params 206

QoS Params 208

FIG. 8

Data Plane Functions 171

- MAC address / VID mapping to and from ATM VPI/VCI 172
- CoS indicators 173
- Congestion Information 174
- Discard Eligibility 175
- Frame length 176
- Multiple QoS Support 177

Control Plane Functions 178

- Connection mapping 179
- Class of service mapping 180
- Parameters mapping 181
- Overhead Calculation 182
- Multiple QoS support 183

ATM / Ethernet mapping

| ATM → Ethernet Direction | 272 |
|---|---|
| $CIR=PCR_{0+1}$, $CBS=CDVT*AR$, EIR & EBS=0 | 274 |
| $CIR=SCR_{0+1}$, $CBS=MBS(1-CIR/AR)$, EIR & EBS=0 | 276 |
| $CIR = SCR_0$, $CBS = MBS(1-CIR/AR)$, $EIR=PCR_{0+1}-SCR_0$, $EBS=CDVT*AR$ | 278 |
| CIR=0, CBS=0, $EIR=PCR_{0+1}$, $EBS=CDVT*AR$ | 280 |
| CIR=MDCR, CBS is configurable, $EIR=PCR_{0+1}-CIR$, $EBS=CDVT*AR$ | 282 |

| Ethernet → ATM direction | 284 |
|---|---|
| $PCR_{0+1}=CIR+EIR$ or $PCR_{0+1}=AR$ | 286 |
| $MBS=CBS/(1-CIR/AR)+1$ | 288 |
| $SCR_{0+1}=CIR$ | 290 |
| $SCR_0=CIR$ | 292 |
| MDCR=CIR | 294 |

FIG. 12

| ATM → Ethernet Direction | 304 |
|---|---|
| PIR=$PCR_{0+1}$, PBS=CDVT*AR | 306 |
| CIR & CBS=0 | 308 |
| CBS=MBS(1-CIR/AR) | 310 |
| CIR=$SCR_{0+1}$ | 312 |
| CIR=$SCR_0$ | 314 |
| CIR & CBS=0 | 316 |
| CIR=MDCR, CBS is configurable | 318 |

| Ethernet p-bits | ETH PHB | ETH Service Class | ATM Service Class | ATM VCC ID | ATM QoS | ATM CLP |
|---|---|---|---|---|---|---|
| 111 | EF | Platinum | Real-time | 1 | CBR | 0 |
| 110 | AF31 | Gold | Real-time | 1 | “” | 0 |
| 101 | AF32 | Gold | Real-time | 1 | “” | 1 |
| 100 | AF21 | Silver | Mission-critical data | 2 | rt-VBR | 0 |
| 011 | AF22 | Silver | Mission-critical data | 2 | “” | 1 |
| 010 | AF11 | Bronze | Regular Data | 3 | nrt-VBR | 0 |
| 001 | AF12 | Bronze | Regular Data | 3 | “” | 1 |
| 000 | DF | Best Effort | Regular Data | 3 | “” | 1 |

FIG. 19

METHOD AND SYSTEM FOR ETHERNET AND ATM SERVICE INTERWORKING

CROSS-REFERENCE TO RELATED APPLICATIONS

This application is related to and claims priority to U.S. patent application Ser. No. 60/537,744, filed Jan. 20, 2004, entitled, ETHERNET DIFFERENTIATED SERVICES, the entirety of which is incorporated herein by reference. This application is also related to U.S. patent application Ser. No. 10/990,899, filed Nov. 17, 2004, entitled, METHOD AND SYSTEM FOR FRAME RELAY AND ETHERNET SERVICE INTERWORKING and U.S. patent application Ser. No. 11/008,709, filed Dec. 9, 2004, entitled, METHOD AND SYSTEM FOR ETHERNET AND FRAME RELAY NETWORK INTERWORKING, the entirety of all of which are incorporated herein by reference.

STATEMENT REGARDING FEDERALLY SPONSORED RESEARCH OR DEVELOPMENT n/a

BACKGROUND OF THE INVENTION

1. Statement of the Technical Field

The present invention relates to the field of networking communications and more particularly to a method and system for allowing efficient communications across disparate networking technologies such as asynchronous transfer mode (ATM) and Ethernet.

2. Description of the Related Art

Network technologies are not homogeneous. End-to-end connections can span multiple networking technologies, for example, Ethernet, asynchronous transfer mode, frame relay (FR), multi-protocol label switching (MPLS), and Internet protocol (IP). In addition, an Ethernet network may include multiple customer edge devices, switches, and routers. These components may communicate using different protocols, spanning the various layers of the OSI interworking model (e.g., L1-L7). For example, routers communicate using a layer three (L3) protocol while the switches communicate using a layer two (L2) protocol.

While solutions have been proposed to allow the transport of data between end points supported by disparate technologies, such solutions are typically inefficient and inadequate solutions such as encapsulation and data extraction and simple repacketizing. These solutions fail to consider or address the preservation of aspects of the data transport environment such as quality of service, prioritization, etc. For example, class of service bits in an Ethernet frame are ignored and/or dropped when current technologies convert or encapsulate the data for delivery on the ATM portion of the network.

It is desirable to have an internetworking solution which allows the transport of ATM originated data to an Ethernet-based destination, and vice-versa, in a manner which preserves, throughout the network, networking features associated with the originating networking technology.

SUMMARY OF THE INVENTION

The invention describes an architecture and methods that enable service interworking between Ethernet and ATM networks with single or multiple QoS levels, with different levels of performance guarantees. Service interworking enables end users to communicate using different networking protocols, without performing any specific protocol interworking functions. The method and system of the present invention are also more bandwidth efficient than the network interworking methods that encapsulate the entire frame of one protocol by the other protocol. The architecture provides flexibility in the location and functions of the internetworking function device, and describes methods for direct interworking or interworking over other network technologies.

According to one aspect, the present invention provides a device for interworking between an Ethernet communication network and an ATM network, in which a first network interface is operable to communicate with the Ethernet communication network using an Ethernet communication protocol. A second network interface is operable to communicate with the ATM communication network using an ATM protocol. A processing unit is in communication with the first network interface and the second network interface, in which the processing unit terminates frames received from a one of the ATM communication network and the Ethernet communication network and maps parameters corresponding to the received one of the ATM and Ethernet frames into the other of the ATM and Ethernet frames. The mapped parameters include connection configuration control plane information and data plane parameters corresponding to individual frames.

According to another aspect, the present invention provides a method for service interworking between an Ethernet communication network and an ATM network, in which frames received from a one of the ATM communication network and the Ethernet communication network are terminated. Parameters corresponding to the received one of the ATM and Ethernet frames are mapped into the other of the ATM and Ethernet frames. The mapped parameters include connection configuration control plane information and data plane parameters corresponding to individual frames.

According to yet another aspect, the present invention provides a storage medium storing a computer program which when executed by a processing unit performs a method for service interworking between an Ethernet communication network and an ATM network, in which the frames received from a one of the ATM communication network and the Ethernet communication network are terminated. Parameters corresponding to the received one of the ATM and Ethernet frames are mapped into the other of the ATM and Ethernet frames. The mapped parameters include connection configuration control plane information and data plane parameters corresponding to individual frames.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 8 is a table of ATM service categories and parameters;

FIG. 12 is a table of traffic parameter calculations;

FIG. 14 is a table of traffic parameter calculations;

FIG. 19 is a table showing an example of mapping between Ethernet p-bits and ATM connections.

DETAILED DESCRIPTION OF THE PREFERRED EMBODIMENTS

Architecture

Figure 1A:
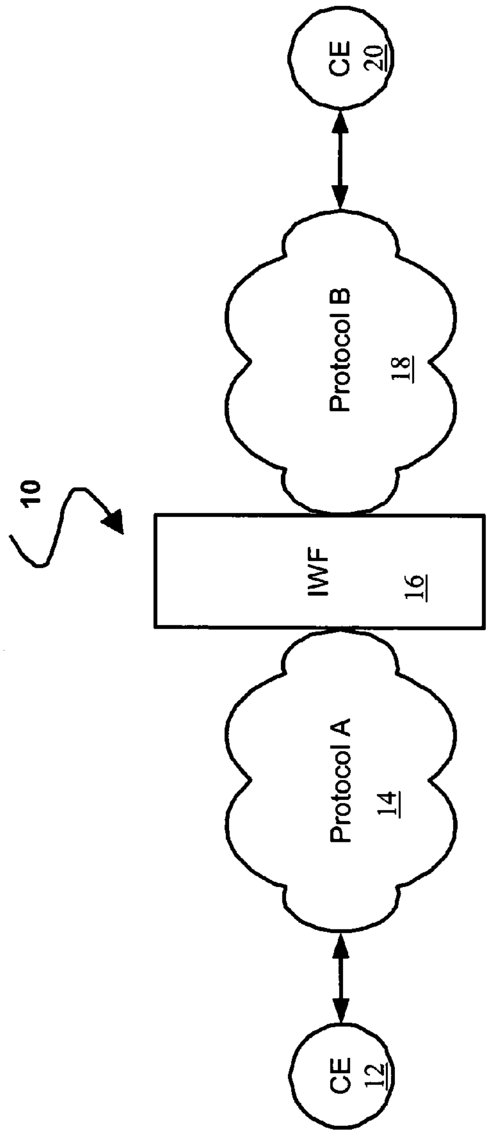
FIG. 1A is a block diagram of an interface between two networks with different protocols.

Referring now to the drawing figures in which like reference designators refer to like elements, there is shown in FIG. 1A, a system constructed in accordance with the principles of the present invention and designated generally as "10". System 10 includes two network segments connected by an interworking function (IWF) device 16. The two segments, network segment 14 and network segment 18, operate using different types of protocols. The protocols can include, for example, Ethernet, asynchronous transfer mode (ATM), frame relay (FR), multi-protocol label switching (MPLS), and Internet protocol (IP). Customer edge (CE) devices 12 and 20, for example, routers, switches, etc. are connected to network segments 14 and 18, respectively, and serve to interface customer networks (not shown) to system 10. Router, switches, etc. for interconnecting a customer device or network to another network such as a service provider network are known in the art. In the most general sense, the IWF device 16 provides interworking functionality and maps relevant parameters from protocol A (network segment 14) to parameters for protocol B (network segment 18).

Figure 1B:
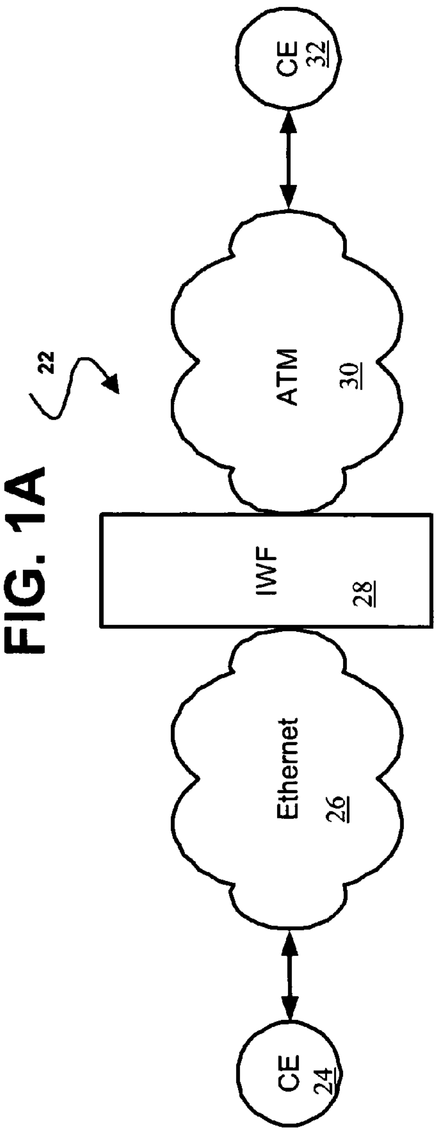
FIG. 1B is a block diagram of a system having an Ethernet network segment and an ATM network segment.

Referring to FIG. 1B, a particular example of a system 22 including two network segments connected by an IWF device 28 is shown. The IWF device 28 is disposed between the edges of an Ethernet network 26 and an ATM network 30. Each network includes connections to customer edge devices such as devices 24 and 32. IWF device 28 can be a stand alone computing device arranged to implement the functionality described herein or can be integrated as part of other networking components such as routers and switches as are known in the art. If implemented as a stand alone computing device, IWF device 28 includes a processing unit, memory, input and output interfaces as well as network communication interfaces as may be implemented by one of skill in the art to implement the functions described herein.

Initially, it is helpful to describe features of ATM traffic management. ATM provides a comprehensive set of traffic management capabilities. For example, as is known in the art, ATM defines multiple service categories aimed at different applications. These service categories include constant bit rate (CBR), real time variable bit rate (rt-VBR), non-real time variable bit rate (nrt-VBR), unspecified bit rate (UBR), available bit rate (ABR) and generic frame rate (GFR). The most widely deployed services include CBR, rt-VBR, nrt-VBR and UBR. The VBR services are further divided into VBR.1, VBR.2 and VBR.3 which differ in their conformance definition and the use of an excess traffic tagging option.

ATM's traffic management capabilities also define traffic parameters and an associated usage parameter control (UPC) to enforce CE device compliance to the traffic parameters. ATM provides an admission control function that limits the number of accepted connections to ensure that the ATM network can meet the specified quality of service (QoS) parameters for cell loss and delay. ATM also provides a cell loss priority field (CLP) in the cell header (described below). Cells with CLP=1 are typically discarded first when network congestion is experienced. An explicit forward congestion indication (EFCI) field is available in the cell header to convey network congestion indications in the forward direction. Of note, EFCI is a binary mechanism that operates only to indicate whether or not the network is congested.

Figure 2:
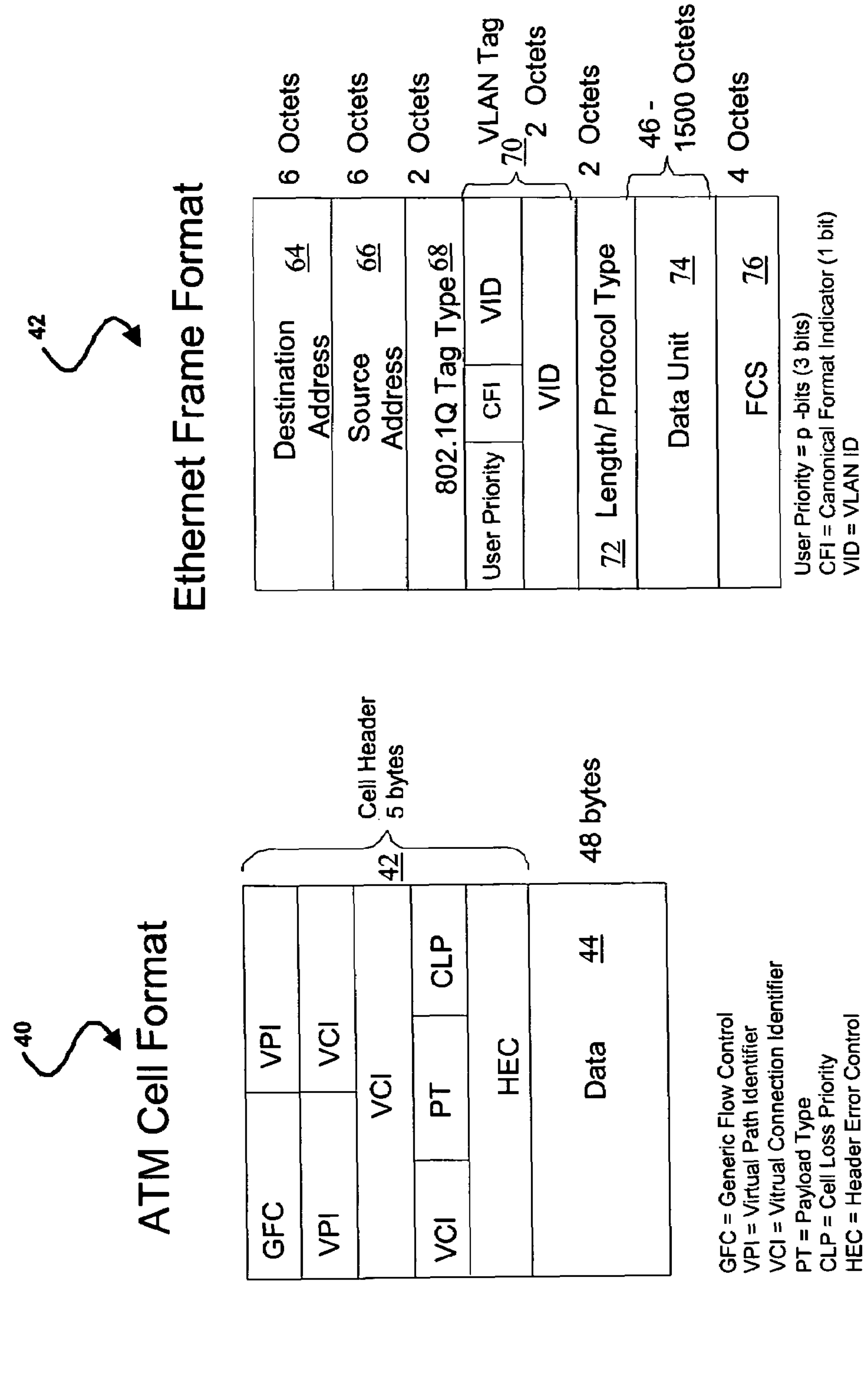
FIG. 2 is a block diagram of an ATM cell and an Ethernet frame.

Referring to FIG. 2, the format of an ATM cell 40 and the format of an Ethernet frame 42 such as may be transported on Ethernet network 26 and ATM network 30 are shown. The ATM protocols include an adaptation layer above the ATM cell switching layer, which provides a suitable interface between the variable length application protocol data units (PDUs) and the ATM layer. The adaptation layer is structured into the segmentation and reassemble (SAR) sublayer, the common part convergence sublayer (CPCS), and the service specific convergence sublayer (SSCS). The most common adaptation layer used for data communications is the ATM Adaptation Layer 5 (AAL5), which performs frame segmentation and reassembly into/from ATM cells and other functions such as error checking of the assembled frame. The ATM cell 40 includes a 5 byte cell header 42 and a 48 byte data portion 44. The cell header 42 includes bits/bytes for generic flow control (GFC), a virtual path identifier (VPI), a virtual connection indicator (VCI), a payload type (PT), the CLP and header error control (HEC). The AAL5 frame format (not shown) includes 4 bytes CRC, 2 bytes length field, 2 bytes control field, 0-47 bytes padding, and a variable length user data field. Of note, the terms "cell" and "frame" are used interchangeably herein when referring to ATM structures and arrangements.

As is readily seen in FIG. 2, the format of an Ethernet frame 42 differs from that of the ATM frame 40. The tagged Ethernet frame 42 includes a six octet MAC destination address 64, a six octet MAC source address 66, a two octet 802.1Q tag type 68, a two octet VLAN tag 70, a two octet length/protocol type field 72, and a four octet FCS field 76. In addition to the addressing and service information, a 46-1500 octet data unit 74 is included in the tagged Ethernet frame 42. Of note, the VLAN tag 70 includes a user priority, also known as "p-bits". Of note the preamble and start-of-frame delimiter field (SFD) applicable to IEEE 802.3 specific media are not shown because they are not included as part of the Ethernet traffic parameters. It should also be recognized that IEEE 802.3 Carrier Sense Multiple Access with Collision Detection (CSMA/CD) is used as an example and that the present invention is applicable to other media types defined by other framing arrangements, such as IEEE 802.11 wireless, etc.

When a packet or frame is forwarded between networks 26 and 30, the IWF device 28 terminates the protocol used in one network, and translates and/or maps its protocol control information to that of the protocol used in the other network. This is done for the data plane and control plane, both of which are described below in detail. In general, the control plane includes configured or signaled information that determines the overall behavior, mappings, resource allocation and forwarding parameters that can be applied to all connection frames or frames of a service class. Such information is typically established and used to set up the network devices before any payload traffic is transmitted. Data plane refers to the frame processing functions that typically take place in real-time on a frame-by-frame basis.

Service interworking in accordance with the present invention involves mapping cell header 42 elements in an ATM cell 40 to elements of the IEEE 802.3 or Ethernet V2 frames, with or without Q-Tag (VLAN awareness) as specified in 802.1Q and modifying the upper layer protocol encapsulation information, as applicable with respect to relevant technical standards.

Figure 3A:
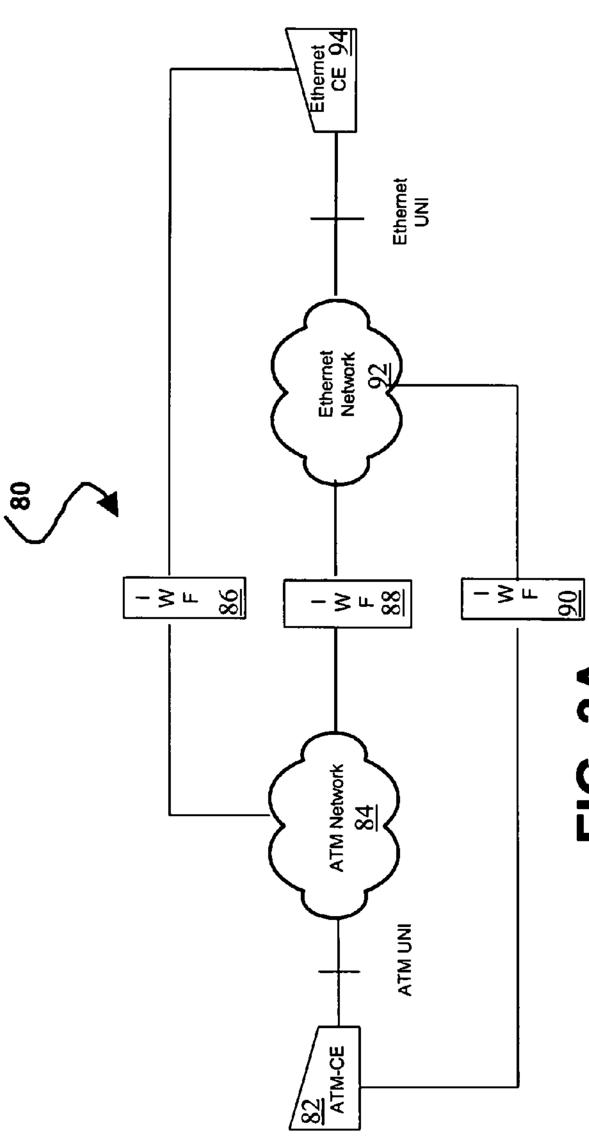
FIG. 3A is a block diagram of a network architecture.

An architecture suitable for encapsulation and/or translation constructed in accordance with the principles of the present invention is described with reference to FIGS. 3A and 3B. Referring to FIG. 3A, a network architecture 80 is shown in which the IWF can be located at any of a plurality of locations within the network. The architecture 80 includes an ATM customer edge device 82 and an Ethernet customer edge device 94. An ATM network 84 and/or an Ethernet network 92 connect the ATM customer edge device 82 and the Ethernet customer edge device 94. An IWF device provides an interface between the ATM network 84 and an Ethernet network 92 or between a customer edge device of one type and a network of a different type. For example, IWF device 88 provides an interface between the ATM network 84 and an Ethernet network 92. An IWF such as IWF device 86 provides an interface between the ATM network 84 and the Ethernet customer edge device 94, and IWF device 90 provides an interface between the ATM customer edge device 82 and the Ethernet network 92. The IWF can physically reside in the Ethernet customer edge 94 or Ethernet network 92, ATM customer edge 82 or ATM network 84, or in a separate device between the networks or at the user-network interface. This provides significant interworking flexibility. The chosen configuration in any particular network will depend on several factors such as equipment cost and capabilities (both on the network and customer sides), current network deployment, and network evolution strategy.

Figure 3B:
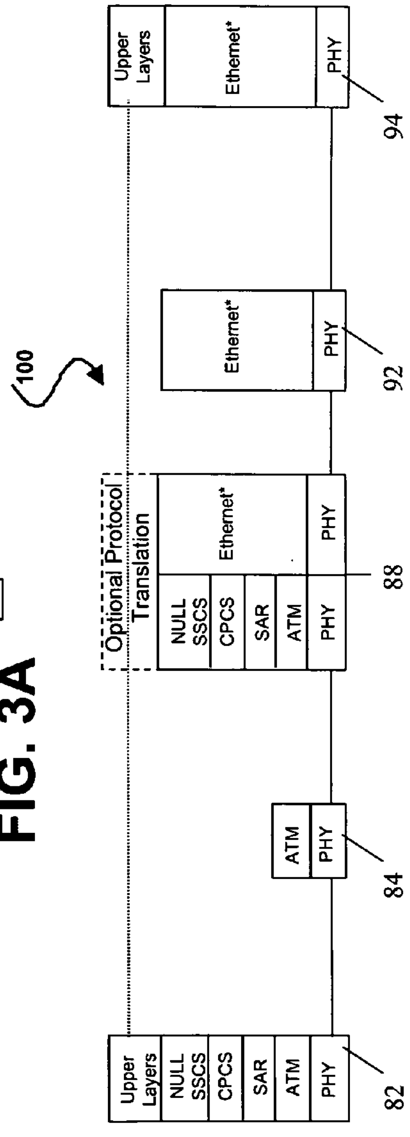
FIG. 3B is a block diagram of a protocol stack in relation to the network architecture of FIG. 3A.

Referring to FIG. 3B shows a protocol-based view of the architecture of FIG. 3A taken from customer edge device 82 to customer edge device 94 via IWF 88. As is shown in FIG. 3B, the devices are interconnected to provide a physical path from ATM CE 82 to Ethernet CE 94. The ATM-based elements (CE 82, network 84 and a portion of IWF 88) also include a core arranged to support the native ATM protocol.

To support service interworking, upper layer protocols such as IP, IPX, etc. are encapsulated. For example, Internet Engineering Task Force (IETF) Request for Comment (RFC) 2684 defines an encapsulation procedure for upper layer protocols over ATM adaptation layer 5 (AAL5). Encapsulation procedures are available for both routed and bridged encapsulation mode frames. Two encapsulation methods are described. The "LLC Encapsulation" method allows multiplexing of multiple protocols over a single ATM virtual connection (VC). The protocol type of each PDU is identified by a prefixed IEEE 802.2 Logical Link Control (LLC) header. In the "VC Multiplexing" method, each ATM VC carries PDUs of exactly one protocol type. When multiple protocols need to be transported, there is a separate VC for each. Point-to-point protocol (PPP) encapsulation over ATM is defined in RFC 2364. The PPP Protocol provides a standard method for transporting multi-protocol packets over point-to-point links.

Standards also exist for encapsulating upper layer protocols (ULPs) over Ethernet, for example RFC 894 for IP and RFC 2516 for PPP. RFC 894 for IP and RFC 2516 for PPP are incorporated herein by reference. It is also contemplated that IWF 28 can translate these upper layer protocols. On the Ethernet side, e.g. in Ethernet CE 94, the Length/Protocol type field (see FIG. 2, reference designator 72) in the Ethernet frame header identifies the upper layer protocol transported, e.g. IP (RFC 894) or PPP (RFC 2516) for the Ethernet V2 frame format. An LLC/SNAP header is added for identifying the upper layer protocol in the IEEE 802.3 frame format, since field 72 (in FIG. 2) specifies a length and not a protocol type in that case.

On the ATM side, e.g. in ATM CE 82, the upper layer protocol is encapsulated using the procedures described in RFC 2684 (or RFC 2364 for PPP). The IWF device 88 may also perform upper layer protocol encapsulation translation from ATM AAL-5 to Ethernet and vice versa. When encapsulation modes to be used are not standardized, but they are compatible between terminal equipment, the IWF device 88 can also operate in transparent mode.

The service interworking methods described herein preferably use a routed encapsulation mode. In addition to frame encapsulation, to forward the packet to the appropriate destination as described in the standards listed above, in accordance with the present invention, IWF device 88 provides service and parameter mapping between the ATM network 84 and the Ethernet network 92.

Of note, the asterisk next to the term "Ethernet" in IWF 88, Ethernet network 92 and Ethernet CE 94 in FIG. 3B refers to the ability of the present invention to support both virtual local area network (VLAN) aware and VLAN unaware Ethernet options. VLANs and the concepts employed by virtual networking are known in the art. In general, VLAN aware Ethernet includes packets arranged according to the base Ethernet standard, e.g. Institute of Electrical and Electronics Engineers (IEEE) standards 802.3/V2 as well as a "Q-tag" under IEEE 802.1Q. The present invention is applicable to implementations of VLAN unaware (use only of base Ethernet 802.3/V2) Ethernet networks as well as VLAN aware Ethernet networks. It is also contemplated that the present invention can be implemented in a manner that is independent of the physical media. For example, it is contemplated that the present invention can be implemented using the IEEE 802.11 wireless technologies.

Service interworking applies when an ATM service user interworks with an Ethernet service user. The Ethernet service device performs no ATM specific functions, and ATM service device performs no Ethernet service specific functions. In the Ethernet to ATM direction, the IWF terminates the Ethernet protocol and maps its information into the ATM protocol. The reverse occurs in the ATM to Ethernet direction. In addition, the IWF may also perform translation of the ULP encapsulation information.

Note that service and network interworking use "encapsulation" differently. In network interworking, the entire frame is encapsulated. For example, the Ethernet user/CE would send an IP-over-Ethernet frame. The IWF would encapsulate the entire frame over ATM. The transported core frame would contain the original (IP payload+Ethernet header)+ATM encapsulation header. No ULP "translation" is needed.

In service interworking, the subject of the present invention, the Ethernet header is not transported when going from Ethernet to ATM. The IP payload is extracted by the IWF from the frame, and transported directly over the second protocol.

In translation mode, an additional step is performed: the Layer 2 (L2) encapsulation header of the source protocol (Ethernet or ATM) is used to derive the L2 encapsulation of the destination protocol.

Figure 4:
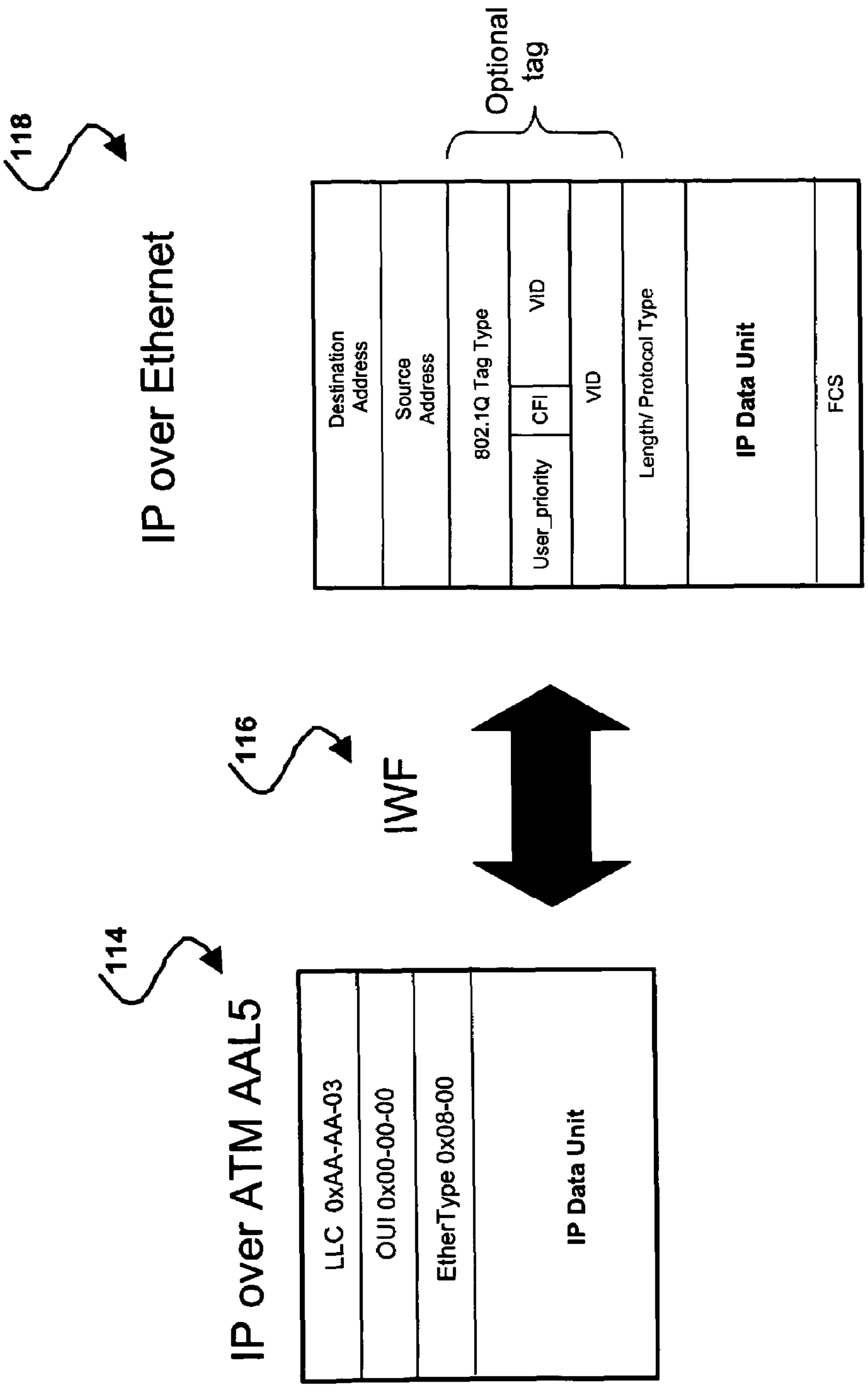
FIG. 4 is a block diagram of an IP over ATM cell and an IP over Ethernet frame.

Encapsulation of an upper layer protocol is explained. Referring to FIG. 4, an example of a routed encapsulation mode frame is shown using the internet protocol (IP) as an example of a ULP. It is contemplated that other ULPs, such as the point-to-point protocol (PPP), Internetwork Packet Exchange (IPX), etc. can be supported. It can be desirable to carry IP end-to-end using Ethernet-to-ATM service interworking. This is sometimes referred to as a "routed encapsulation mode." To carry the IP information end-to-end, an IWF 116 provides interworking between the IP over ATM 114 and an IP over Ethernet from 118. The ATM arrangement shown in the ATM AAL5 frame 114 assumes the use of ATM LLC routed encapsulation mode as set out in RFC 2684. Of note, the EtherType corresponding to IP in the ATM frame is recognized by the IWF 116 and the corresponding identifier that the Ethernet frame includes IP as its ULP is established in the Ethernet Length/Protocol Type field for the Ethernet V2 frame format and the LLC/SNAP encapsulation header for the IEEE 802.3 frame format, and vice versa. Accordingly, the IWF 116 creates the encapsulated ULP packet by recognizing the ULP in the arriving packet and creating a corresponding ULP encapsulation entry in the outgoing packet.

Both LLC encapsulation as well as ATM virtual connection (VC) multiplexing can be used for IP encapsulation over AAL-5. VC multiplexing reduces 8 bytes of overhead by eliminating the need for the LLC, OUI and EtherType overhead. As used herein, the term "VC" is used as a general term to include both the virtual channel connection (VCC) and the virtual path connection (VPC). A VCC is defined by is virtual path identifier (VPI) and its virtual channel identifier (VCI) fields.

Figure 5:
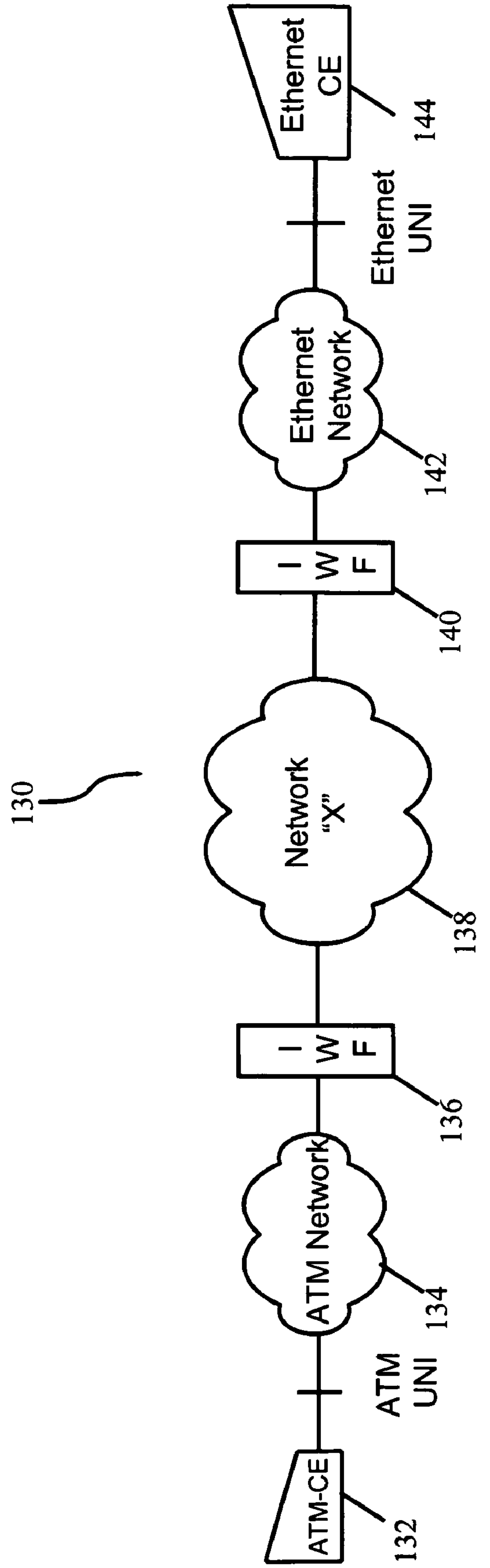
FIG. 5 is a block diagram of a network architecture.

Referring to FIG. 5, it is contemplated that the present invention can support service interworking via a third technology, shown as network 'X' 138 in architecture 130. For example, Ethernet to ATM interworking can be achieved through a technology such as frame relay, where network X is a frame relay network. In this architecture, the IWF device 136 performs service interworking between the frame relay network 138 and an ATM network 134. A second IWF device 140 performs service interworking between the frame relay network 138 and the Ethernet network 142. This allows end to end transport of data between the ATM customer edge device 132 and the Ethernet customer edge device 144. Additional descriptions of service interworking between frame relay and Ethernet can be found in related U.S. patent application Ser. No. 10/990,899, filed Nov. 17, 2004, by the same inventors.

While in the example above, the interworking via a third technology includes an frame relay core, other core networks can be used. For example, the interworking could be achieved over an MPLS core. In the case where network 'X' 138 is an MPLS backbone network, IWF device 136 would perform ATM to MPLS service interworking and IWF device 140 would perform MPLS to Ethernet service interworking.

Figure 6A:
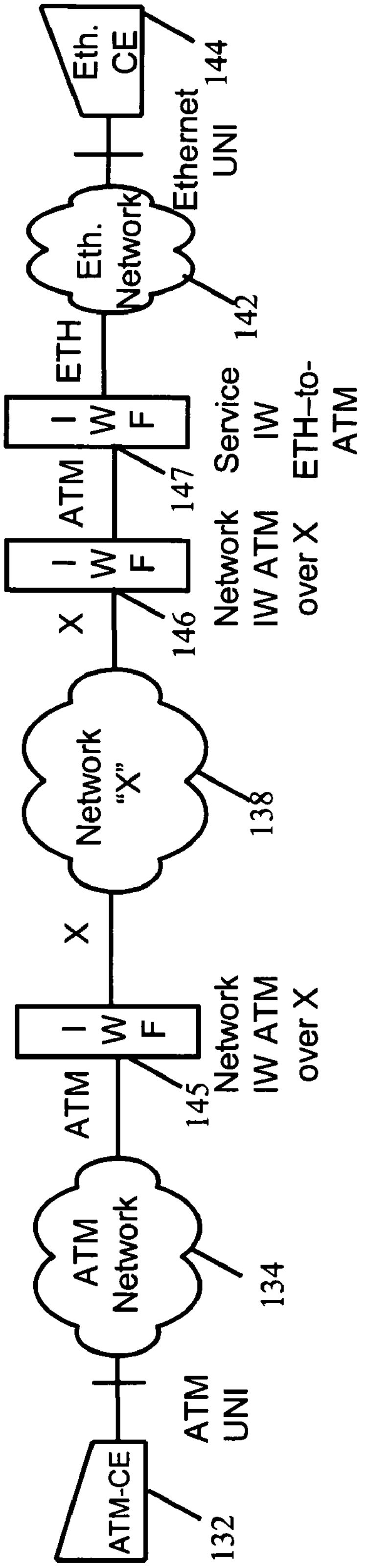
FIG. 6A is a block diagram of a network architecture.
Figure 6B:
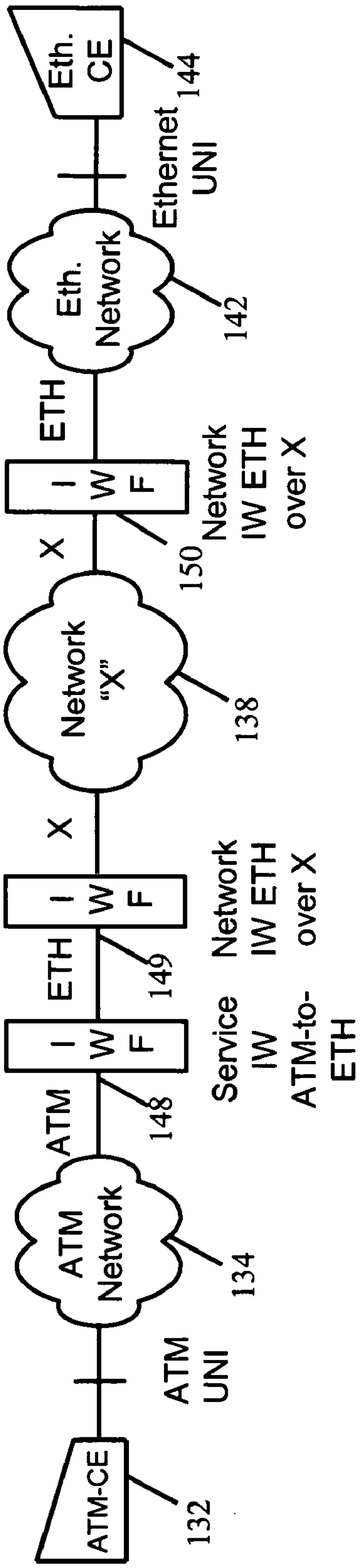
FIG. 6B is a block diagram of a network architecture.

Referring to FIGS. 6A and 6B, an alternate network architecture for interworking over a third technology is shown. In this method, multiple IWFs provide the interworking. One of the IWFs (e.g., IWF 147 in FIG. 6A or IWF 148 in 6B) performs ETH-to-ATM (or ATM-to-ETH) service interworking as described herein. The resulting protocol is transported over the third core technology (e.g., over frame relay network 138) using two network Interworking Functions (e.g., IWFs 145,146, 149, 150) at both ends of the core network.

Another method of providing service interworking over a third networking communication technology is described with reference to FIGS. 6A and 6B. As shown in FIGS. 6A and 6B, one of the IWFs performs service interworking (Ethernet to ATM or vice versa). The resultant protocol is transported over the network "X' 138 using a networking IWF at the ends of the network "X" 138. In FIG. 6A, the service interworking occurs between the network "X" 138 and the Ethernet network 142 via IWF 147. In this example, the ATM AAL5 frame will be transported across the third technology using network IWFs 145 and 146 at both edges of network "X" 138. In FIG. 6B, the service interworking occurs between ATM network 134 and the network "X" 138. In this example, an Ethernet frame is transported across this third technology using network IWFs 149 and 150 at both edges of network "X" 138.

The physical implementation of the IWFs is flexible: they may be combined together, deployed in separate devices, or combined with existing network elements. While the example above shows a network "X" 138, like the network shown and described with respect to FIG. 5, network types such as frame relay and MPLS are contemplated.

Figure 7:
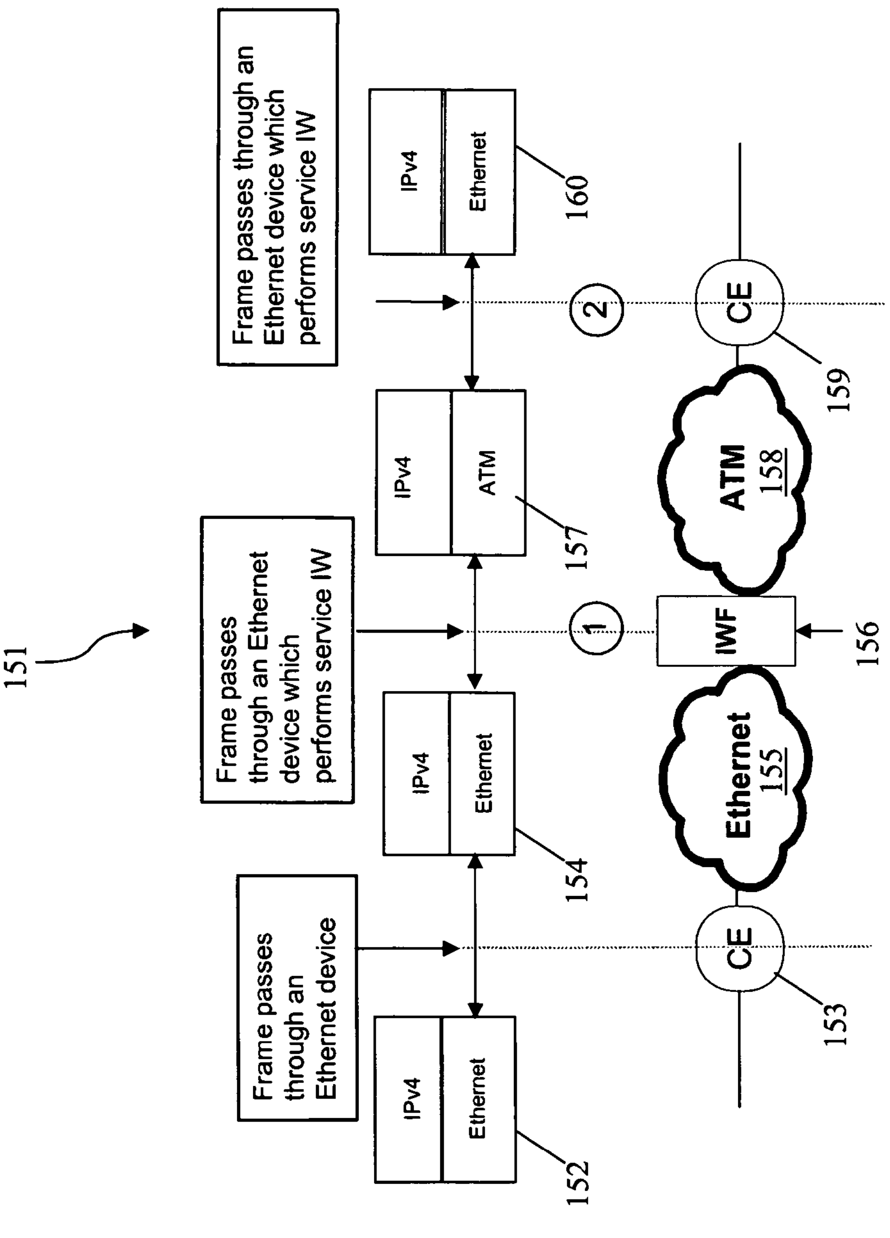
FIG. 7 is a block diagram of an interworking example.

Referring to FIG. 7, an example architecture 151 that provides router connectivity through L2 Ethernet and ATM provider networks is shown. In this example, there is one provider with two networks. The architecture 151 includes two Ethernet-based IP networks with CE devices 153 and 159 connected by an Ethernet network 155 and an ATM network 158. Frames can be delivered from a device on one IP network to a device on the other IP network using IWF devices to perform service interworking between the Ethernet and ATM protocols. The IPv4 frame is encapsulated with the appropriate format for each network. For example, frame 154 includes the IPv4 frame encapsulated for an Ethernet network for delivery within Ethernet network 155 while ATM frame 157 includes the IPv4 frame encapsulated for an ATM network for delivery within ATM network 158. The interworking functions map the ULP/IP service parameters (for example, traffic, QoS) to the Ethernet/ATM equivalent parameters. Additional value-added Layer 3 (L3) specific functions such ARP mediation can be performed by the provider Service IW Function.

To deliver a frame from CE device 153 to CE device 159, the frame passes through both the Ethernet network 155 and the ATM network 158. After the frame passes from CE device 153 through the Ethernet network 155, IWF 156 de-encapsulates the IP frame from the Ethernet frame 154 and encapsulates the IP frame in an ATM AAL5 frame 157, and performs other Ethernet-to-ATM service IW functions. A second interworking function occurs at the CE device 159. CE device 159 decapsulates the IP frame from the ATM frame 157 and encapsulates it in an Ethernet frame 60 for subsequent delivery.

To deliver a frame from CE device 159 to CE device 153, the frame passes through both the ATM network 158 and the Ethernet network 155. CE device 159 includes service interworking functionality, and de-encapsulates the IP frame from the Ethernet frame 160 and encapsulates it in an ATM frame 157. IWF device 156 de-encapsulates the IP frame from the ATM 157 frame and encapsulates it in an Ethernet frame 154 for delivery through the Ethernet network 155.

The IWF can be implemented as a separate unit, as part of a CE device or as part of a provider edge (PE) device such as a provider-owned router or switch. It is also contemplated that the IWF can be implemented at the network to network interface (NNI) between provider networks. For example, in the case where the provider network is based on Metro Ethernet Forum (MEF) standards as are known in the art, the present invention can be implemented by extending these standards to allow the deployment of the IWF in the PE device, such as a PE device that interfaces an ATM CE to the service provider Ethernet network. In the case where the provider network is an ATM Network, the PE device including the IWF is one that interfaces an Ethernet CE device to the provider ATM network. In both cases, ATM service categories and parameters are mapped to corresponding Ethernet Virtual Connections (EVCs), described below in detail.

While FIGS. 1-7 describe embodiments of architectures for ATM to Ethernet interworking, other network configurations and interworking scenarios are possible. In each configuration, the interworking may include the mapping of service, traffic parameters, and quality of service (QoS) indications. With the architecture of the present invention described above with respect to FIGS. 1-7, the remainder of this document is arranged as follows. Ethernet services supported by the present invention are described next. Following Ethernet services is a description of ATM services supported by the present invention. Service interworking functions for a single class of service arranged in accordance with the present invention follows. Finally, service interworking functions for multiple classes of service arranged in accordance with the present invention are described.

Ethernet Services

Ethernet services supported by the present invention can include well-defined classes with different levels of service, such as Gold, Silver, Bronze, having different frame loss, delay, and jitter guarantees. As used herein, an EVC is a collection of Ethernet frames that are classified and grouped together for the purpose of interworking with ATM. EVC frames have a unique media access control (MAC) address, and a virtual id (VID) if the frames are VLAN aware. EVCs are bidirectional point-to-point connections which allow asymmetrical bandwidth profiles in the different directions. An EVC identifiable by a VID or port can support single or multiple service classes. This arrangement advantageously allows bandwidth to be defined on a per class of service (CoS) basis. An EVC can be based on the Ethernet port, the Ethernet port and the VID, MAC source and destination address pairs or the MAC source, destination address and VID. This of course, assumes that an EVC can not support more than one VLAN.

An EVC can be associated with one or more bandwidth profiles and with one or more forwarding treatment rules for its frames. From a quality of service (QoS) perspective, a single QoS EVC provides a single bandwidth profile and a single forwarding treatment for all frames within the EVC. A multiple CoS EVC provides a single bandwidth profile and multiple forwarding treatments for all frames within the EVC. A multiple QoS EVC provides multiple bandwidth profiles and multiple forwarding treatments for all frames within the EVC. The bandwidth profile is used for resource reservation and allocation, admission control and traffic policing and is a control plane function, described below in detail. The forwarding treatment indicates scheduling and discard treatment of the frame. Forwarding treatment is specified by the per hop behavior (PHB) assignments to the frame and is based on EVC type, and of OSI protocol Layer 1-7 fields. Forwarding treatment is a data plane function, described below in more detail. PHB is an indication of the forwarding treatment applied to a frame and indicates a frame per-hop scheduling class (PSC) and drop precedence (DP), where higher DP frames are discarded before lowed DP frames in a congestion condition. Bandwidth profile and forwarding treatments are independent from one another in accordance with the present invention. Frames with different service classes can be combined with the same bandwidth profile or assigned to separate bandwidth profiles.

The IEEE 802.1Q tag in a tagged Ethernet service frame (see FIG. 2) includes p-bits in the frame header. These p-bits can be used to identify nodal behavior and determine the forwarding treatment received by the Ethernet frame. Such nodal behavior includes expedited forwarding, assured forwarding, and default forwarding. The present invention provides a number of options for supporting and identifying the Ethernet frame service class behavior, e.g. scheduling, drop precedence and expected performance.

As one option, Ethernet frame service class and drop precedence can be identified using Ethernet L2 indicators only. The most common fields are the p-bits, but other L2 indicators such as the CFI bit, source and destination MAC addresses and VLAN ID can be used. This option is suitable for pure Ethernet L2 networks, and has the advantage of being simple and independent from the ULP carried by the Ethernet frame.

As another option, the more general multi-field classification that spans any of the Layer 1 to Layer 7 protocol layers can be used, either individually or in combination. For example, if the frame is carrying IP traffic, this option can use the IP protocol information such as the protocol type, IP source and destination addresses, differentiated services code point and/or TCP/UDP port numbers.

As used herein, Ethernet per-hop-behavior (PHB) data is defined as the per-hop scheduling class (PSC) data plus the drop precedence data. Additional information regarding Ethernet PHBs can be found in the inventors' pending U.S. patent application Ser. No. 10/868,536, entitled ETHERNET DIFFERENTIATED SERVICES, the entirety of which is incorporated herein by reference. The basic principle is that each incoming Ethernet frame is assigned a PHB which specifies forwarding treatment of the frame by edge and core network nodes. Generally, PSC is synonymous with a service class or service, but it is contemplated that multiple PSCs can be combined into a single service class. If single service is supported, all frames are treated and mapped equally by the IWF, irrespective of the interface being VLAN-aware or VLAN-unaware and the presence/absence or encoding of the p-bits.

Alternatively, a single service per port/VID could be supported based on the VID or p-bits value on VLAN-aware interfaces. If multiple services are supported by the Ethernet connection, multiple traffic contracts/parameters may be specified independently for each service (traffic contracts can be used for traffic policing, resource reservation/admission control, and SLAs). In effect, each service can be treated independently like a separate sub-connection.

ATM Services

ATM virtual connection cell transfer and discard priorities can be established based on the ATM connection service category and the CLP indication. ATM services typically include well-defined classes as described above, which can be used for supporting services such as gold, silver, bronze. Each service is distinguished with different parameters. FIG. 8 is a table 200 showing the relationship between ATM service categories and parameters. Table 200 includes ATM layer service categories 202 and ATM parameters 204. ATM parameters 204 include traffic parameters 206 and QoS parameters 208 which themselves include various combinations of parameters for peak cell rate (PCR), cell delay variation tolerance (CDVT), sustained cell rate (SCR), maximum burst size (MBS), minimum desired cell rate (MDCR), maximum frame size (MFS), cell delay variation (CDV), cell transfer delay (CTD) and cell loss ratio (CLR). These individual parameters are known in the art and are not further described herein. ATM service layer categories 202 are either "specified", "unspecified" or are not applicable (N/A) for these various combinations of parameters 204.

In accordance with the present invention, Ethernet services should be mapped to an equivalent ATM service. For example, an Ethernet service class should be mapped to an ATM service class with the same performance expectations in terms of loss, delay, and jitter.

When single service is supported, all frames are treated/scheduled equally by the IWF. The treatment is determined by Control Plane rules, which may be configured or signaled to indicate the ATM service category. Multiple service classes can be supported on a single ATM VCC, in a value-added non-standard manner. In this case, the frame CoS indicators are used to derive the frame PHB. The CoS indicators can be based on multi-field or behavior aggregate classification. The ATM ALL5 frame per-hop-behaviors may be based on the p-bits, CFI, and IP DSCP, individually or in combination. The per-hop-behaviors determination may alternately or additionally use the MAC address, IP addresses, IP protocol Type, TCP/UDP port number, or any other L1-L7 fields individually or in combination.

Service Interworking Functions

In accordance with the present invention, functions performed by an IWF include control plane functions and data plane functions. As noted above, control plane functions are based on configuration and/or signaling data. An exemplary control plane function is the connection mapping between an EVC and the ATM VCC. Control plane functions also include bandwidth profile mapping between Ethernet and ATM connections. Control plane functions also define the rules for the data plane functions, for example, the mapping/interpretation of the p-bits to the Ethernet PHB, congestion and discard eligibility mapping, etc.

Data plane functions are those that effect the treatment of the user frames and are typically implemented as real-time functions. Exemplary data plane functions include changing the protocol header between Ethernet and ATM, forwarding the frame to the chosen connection/queue and scheduling the connection onto the outgoing link. By way of example, assume an EVC carries VID 5, with a single bandwidth profile. The Ethernet frames received are classified with gold, silver or bronze performance depending on the setting of the p-bits (or other Layer 1-Layer 7 classification as described above). The EVC is mapped to an ATM VCC by the IWF or to multiple ATM VCCs, depending on the network option. The CoS can be asymmetrical.

Single CoS

Figure 9A:
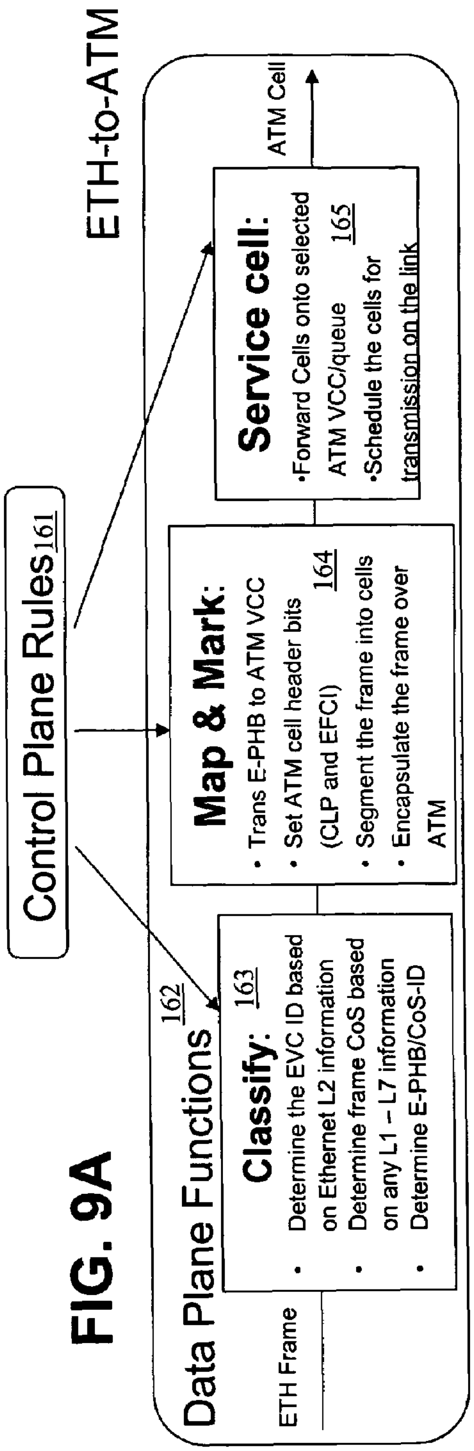
FIG. 9A is a block diagram of Ethernet to ATM control plane rules and data plane functions.
Figure 9B:
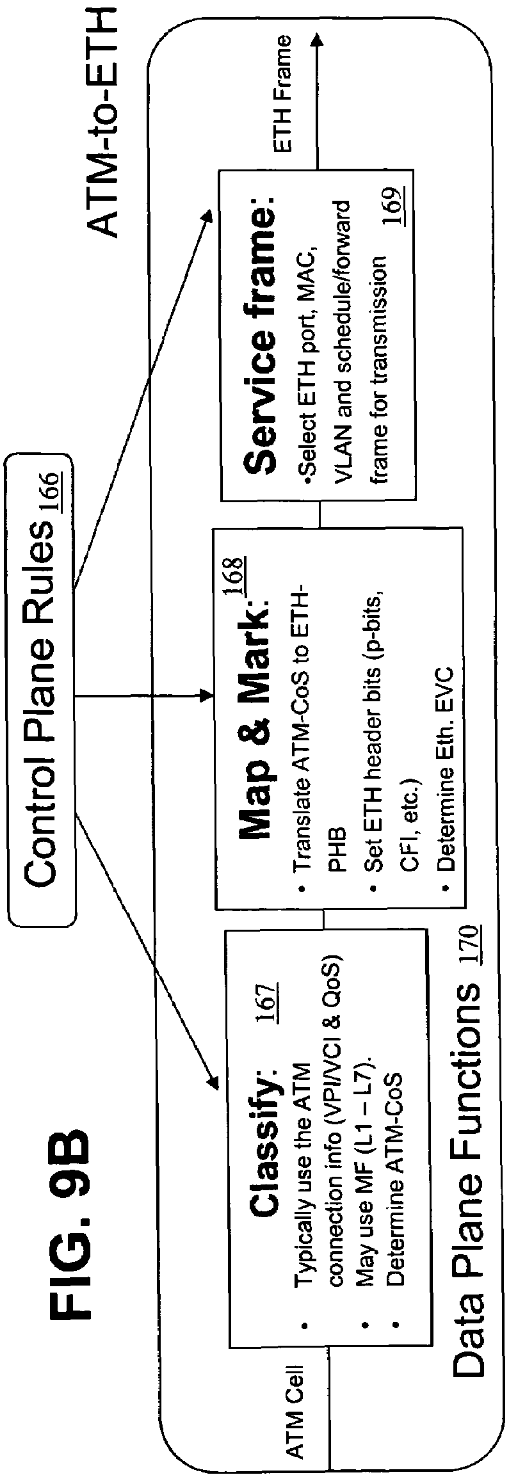
FIG. 9B is a block diagram of ATM to Ethernet control plane rules and data plane functions.

Referring to FIGS. 9A and 9B, the IWF performs both control plane and data plane functions. For single CoS support, there is one-to-one mapping between an ATM connection and an Ethernet virtual connection. An Ethernet virtual connection is identified by a port(interface)/MAC and/or VID. In the ATM to Ethernet direction, the ATM VCC is mapped to VLAN ID (VID). If Ethernet Q-tag identification is not employed, the ATM VCC is mapped to an Ethernet interface/port and/or MAC destination address specified by configuration. In the Ethernet to ATM direction, the VID is mapped to the ATM VCC. If Ethernet Q-tag identification is not employed, Ethernet frames arriving on a particular Ethernet interface/port and/or from a specific MAC source address are mapped to a single ATM VCC.

The IWF also performs class of service mapping. The class of service mapping functions ensure that the IWF meets the QoS/service objectives. For example, a gold Ethernet service/frame is mapped to an equivalent service on the ATM side and vice versa. The mapping rules may be signaled and/or configured, for indicating the QoS level for the Ethernet-to-ATM connection, and the required mapping. This mapping sets the operation/data control functions of the IWF during frame processing.

As is shown in FIGS. 9A and 9B, an IWF uses both data plane functions 162 and 170 and control plane functions as described by control plane rules 161 and 166 to service a frame between an Ethernet network and an ATM network. The data plane functions include classification (e.g., 163 and 167), mapping and marking (e.g., 164 and 168), and servicing of the frame (e.g., 165 and 169). The exact functions performed by the IWF for each of these steps can vary. Control plane rules specify the functionality.

In the Ethernet to ATM direction (FIG. 9A), Control plane rules 161 describe the classification 163, mapping/marking 164, and servicing 165 of the frame. In the Ethernet to ATM direction, when an Ethernet frame arrives at the IWF, the Ethernet frame is classified 163 to (1) determine the EVC ID based on the L2 Ethernet information, (2) determine the frame CoS based on any Layer 1-7 information and (3) determine the Ethernet PHB.

The Ethernet frame is mapped and marked 164 to (1) translate the Ethernet PHB to an ATM CoS, (2) encapsulate the frame into an ATM frame, (3) segment the frame into cells and (4) set the ATM header bits, e.g. the CLP and EFCI. The marked and mapped frame is then serviced 165 to forward the cells onto the selected ATM VCC and to schedule the cells for transmission on the ATM link.

In the Ethernet to ATM direction, the control plane rules 166 are used to determine (1) how the Ethernet frame service class will be determined, (2) the mapping rules from the Ethernet to ATM service classes and (3) the service classes associated with each ATM VCC. The incoming frame is processed to determine the Ethernet frame service class, map the Ethernet service class to the nearest ATM service class and forward the frame onto the ATM VCC that supports the mapped ATM service class.

In the case of a single CoS, the IWF complements the Metro Ethernet Network (MEN) data plane and control plane functions. The MEN data plane functions may perform frame classification, metering and marking, and assign an EVC-ID and a Class-of-service ID/PHB to the Ethernet frame. The IWF maps the EVC-ID to the ATM VCC, maps the drop precedence and congestion indications (CI) from Ethernet to ATM, encapsulates the frame for ATM transport, segments the frame and forwards the frame onto the ATM connection/link. Accordingly, control plane functions for EVC mapping include mapping the EVC and its bandwidth profile to the corresponding ATM connection that best meets the EVC performance objectives.

In the ATM to Ethernet direction (FIG. 9B), control plane rules 166 describe the classification 167, mapping/marking 168, and servicing 169 of the frame. The ATM cell is received by the IWF and classified 167 using ATM connection information (which may include the VPI/VCI and QoS). The frame is reassembled from constituent cells. The frame L1-L7 protocol information may also be used. The ATM CoS is determined. The classified frame is mapped and marked 168 to (1) translate the ATM CoS to an Ethernet PHB, (2) determine the Ethernet EVC, (3) encapsulate the frame into an Ethernet frame and (4) set the Ethernet header bits such as the VID, p-bits, CFI, etc. The mapped and marked frame is serviced 169 to forward the frame onto the selected port/VLAN and schedule the frame for transmission on the Ethernet link. Because some CoS indicators may not be present in the ATM frame, mapping may not be symmetrical.

In the case of a single per-hop scheduling class (PSC)/service class, the IWF maps the ATM VCC to the EVC-ID, maps the drop precedence and congestion indicators (CI) from ATM to Ethernet, encapsulates the frame for transmission over Ethernet and forwards the frame onto the Ethernet connection/link. Accordingly, control plane functions include mapping the ATM VCC identifier and its bandwidth information to the corresponding EVC that best meets the performance objectives and the service class of the frame.

Figure 10:
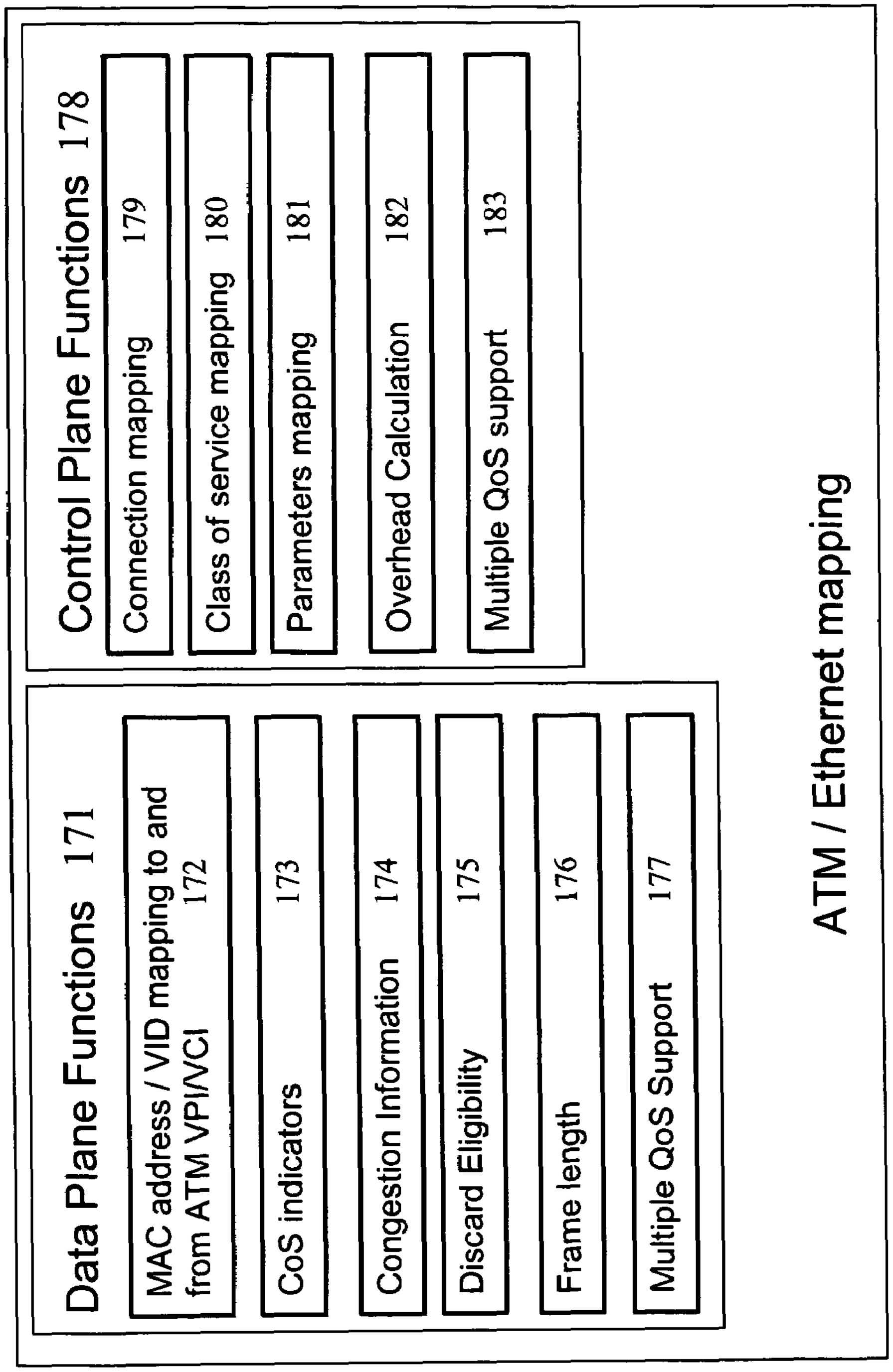
FIG. 10 is a block diagram of ATM to Ethernet mapping parameters.

Referring to FIG. 10, service interworking between an Ethernet network and an ATM network can include mapping multiple functions in both the control plane and the data plane. The control plane functions 178 use configuration and/or signaling information that typically take place before any traffic is sent, and applies to all/many frames of a particular flow/connection. The control plane functions 178 support various CoS functions, connection mapping 179, service class mapping 180, parameters mapping 181 and overhead calculation 182. Support for multiple CoS 183 is discussed below in detail.

With respect to connection mapping, for single CoS support, there is a one-to-one mapping between an ATM connection and an Ethernet virtual connection. Taking the Ethernet to ATM direction first, for VLAN aware interfaces, the VID is mapped to an ATM VPI/VCI. For VLAN unaware interfaces, Ethernet frames arriving on a particular port and/or with a specific MAC source and destination address are mapped to the ATM VPI/VCI. For the ATM to Ethernet direction, the ATM VPI/VCI is mapped to a port+VLAN on VLAN-aware/tagged interfaces. For VLAN unaware interfaces, an ATM VPI/VCI is mapped to an Ethernet port.

With respect to service class mapping (class of service mapping function 180) for a single CoS connection, the present invention supports mapping between ETH EVC and ATM VC service classes. Service class mapping is performed to ensure that the IWF meets the service class objectives. For example, a gold Ethernet service should be mapped to an equivalent service on the ATM side and vice versa. Alternate mappings are permitted to allow for cases where the Ethernet and ATM service classes do not match. Service class mapping sets the data plane functions of the IWF during frame processing. An example of service class mapping is provided above. Of note, as described above, ATM standards support services that are differentiated by their QoS parameter expectations in terms of cell loss and delay. As such, Ethernet services should be mapped to a corresponding ATM service category. For example, a premium service should be mapped to an ATM CBR or rt-VBR service with the same performance expectation with respect to loss and delay.

Figure 11:
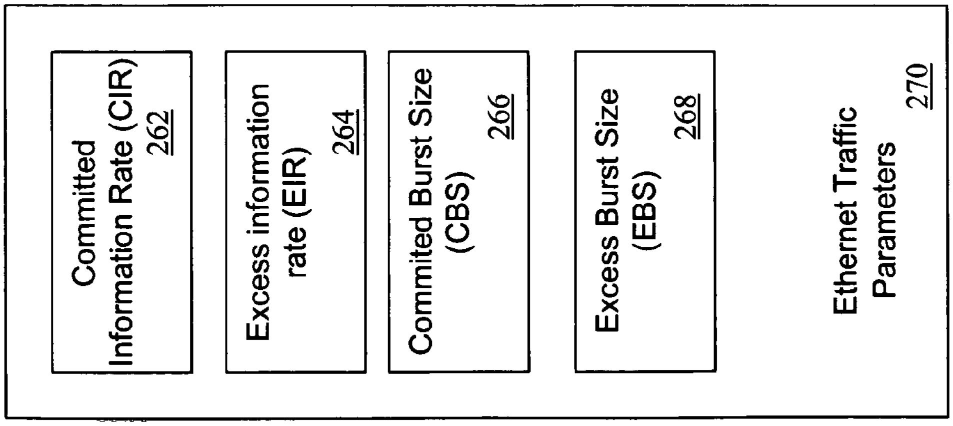
FIG. 11 is a block diagram of Metro Ethernet Forum traffic parameters.

Traffic parameters mapping is discussed with reference to FIGS. 11-14. Referring to FIG. 11, a set of ATM traffic parameters 260 and a set of Ethernet traffic parameters 270 are shown. Traffic parameters are used by many QoS functions: traffic policing and monitoring, BW reservation, admission control, and scheduler configuration.

The standard ATM traffic parameters are described above with reference to FIG. 8. Of note, PCR and CDVT are defined for all service categories. SCR and MBS are defined for the VBR services only and MDCR is defined only for the UBR+ service. The standard Ethernet traffic parameters are shown in FIG. 11 as Ethernet traffic parameters 270 which can be based on the Metro Ethernet Forum Standard. The Ethernet traffic parameters 270 include committed information rate (CIR) 262 in bits per second, excess information rate (EIR) 264 in bits per second, committed burst size (CBS) 266 in bits, and excess burst size (EBS) 268 in bits. Other units may be used such as bytes/octets. The four Ethernet parameters described above are set independently.

Referring to FIG. 12, when a mapping function is set between an ATM and an Ethernet connection, the IWF device calculates the traffic parameters. For example, in the ATM to Ethernet direction 272 the parameters 270 for the Ethernet network (shown in FIG. 11) can be calculated using the ATM traffic parameters 206 (shown in FIG. 8). For the CBR service category, as shown in box 274, $CIR=PCR_{0+1}$, $CBS=CDVT*AR$, $EIR=0$ and $EBS=0$. For the VBR.1 service category, as shown in box 276, $CIR=SCR_{0+1}$, $CBS=MBS(1-CIR/AR)$, $EIR=0$ and $EBS=0$. For the VBR.2 and VBR.3 service categories, as shown in box 278, $CIR=SCR_0$, $CBS=MBS(1-CIR/AR)$, $EIR=PCR_{0+1}-SCR_0$ and $EBS=CDVT*AR$. For the UBR service category, as shown in box 280, $CIR=0$, $CBS=0$, $EIR=PCR_{0+1}$ and $EBS=CDVT*AR$. For the UBR+service category, as shown in box 282, $CIR=MDCR$, CBS is configurable, $EIR=PCR_{0+1}-CIR$ and $EBS=CDVT*AR$. Resulting rates which are greater than the Ethernet link rate should be capped at the Ethernet link rate.

In the Ethernet to ATM direction 284, the parameters for the ATM network 206 can be calculated using the Ethernet traffic parameters 270. As is shown in box 284, $PCR_{0+1}=CIR+EIR$ or, as a conservative option, $PCR_{0+1}=AR$. In either case, CDVT is configured. Additionally, for all VBR services, as is shown in box 288, $MBS=CBS/(1-CIR/AR)+1$. For VBR.1, as is shown in box 290, $SCR_{0+1}=CIR$. For VBR.2 and VBR.3, as is shown in box 292, $SCR_0=CIR$. For the UBR+service category, as is shown in box 294, $MDCR=CIR$. Resulting rates which are greater than the ATM link rate should be capped at the ATM link rate.

Figure 13:
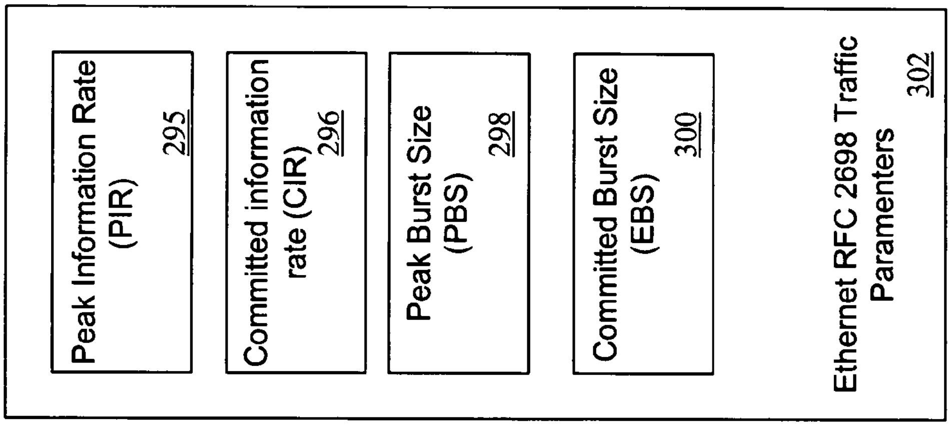
FIG. 13 is a block diagram of Ethernet RFC 2698 traffic parameters.

Referring to FIG. 13, a set of ATM traffic parameters 206 (as described above with respect to FIG. 8) and a set of RFC 2698-based Ethernet traffic parameters 302 are shown. RFC 2698-based Ethernet traffic parameters 302 include peak information rate (PIR) 294, committed information rate (CIR) 296, peak burst size (PBS) 298, and committed burst size (CBS) 300. The four RFC 2698-based Ethernet parameters are set independently.

Referring to FIG. 14, when a frame is forwarded between an ATM network and an RFC 2698 Ethernet network the traffic parameters are calculated. For example, in the ATM to Ethernet direction (shown in table 304), the parameters for the Ethernet network can be calculated using the ATM traffic parameters 206. Box 306 shows the mappings applicable to all ATM service categories in which $PIR=PCR_{0+1}$ and PBS=CDVT*AR. Additional mappings are applicable for specific service categories. For the CBR service category, as shown in box 308, CIR=0 and CBS=0. For the VBR service categories, as shown in box 310, CBS=MBS(1−CIR/AR). For the VBR.1 service category, as shown in box 312, $CIR=SCR_{0+1}$. For the VBR.2 and VBR.3 service categories, as shown in box 314, $CIR=SCR_0$. For the UBR service category, as shown in box 316, CIR=0 and CBS=0. For the UBR+service category, as shown in box 318, CIR=MDCR and CBS is configurable. Resulting rates which are greater than the Ethernet link rate should be capped at the Ethernet link rate. In the Ethernet to ATM direction, the parameters for the ATM network are set as shown in table 284 in FIG. 12 with one exception. That exception is that, unlike what is shown in box 286, in this alternative case, $PCR_{0+1}=PIR$ or, alternatively, $PCR_{0+1}=AR$.

In all parameter mappings above, a margin may be added to compensate for the increased traffic burstiness and jitter introduced by the IWF and intermediate network segments.

Overhead calculation function 182 (in FIG. 10) is discussed. Referring back to FIGS. 4 and 2, the Ethernet and ATM AAL5 encapsulated frame formats are different. Excluding the preamble and the SFD, the Ethernet header length ($h_E$) is 22 bytes for VLAN-aware interfaces or 18 bytes for VLAN-unaware. The ATM header includes fields in the ATM frame other than the data field.

The IWF strips the MAC header and uses the information field as the only content of the payload of the AAL-5 CPCS-PDU. AAL-5 adds two types of overhead, namely, an AAL-5 trailer ($h_{trailer}$) of 8 bytes and AAL-5 SAR overhead of between 0 and 47 bytes. Of note, the AAL-5 CPCS-PDU length must be an integer multiple of 48 bytes. Accordingly, the number of cells ($N_{cells}$) needed to transport 'm' bytes of data is Ceiling((m+$h_{trailer}$)/48). Recall that cell size, excluding overhead, is 48 bytes. $N_{cells}$ is therefore equal to the smallest integer that is greater or equal to x where x is ((m+$h_{trailer}$)/48).

A correction factor maps rates between Ethernet and ATM networks. Assuming a data length of 'm', the correction factor $a=N_{cells}*53/(m+h_E)$. In the Ethernet to ATM direction, Ethernet rate values are multiplied by 'a'. For example, SCR=a*CIR assuming that both SCR and CIR are expressed in the same bytes/second unit (note that SCR rate may be subsequently divided by the ATM cell size of 53 bytes to convert the rate to conventional ATM traffic unit of cells/second). In the ATM the Ethernet direction, the ATM rate values are divided by 'a'. For example, CIR=SCR/a.

As a specific example, assume a tagged interface, ignore ULP encapsulation and a data unit length of n=20 bytes. $N_{cells}$=Ceiling((20+8)/48)=1. The number of ATM bytes needed to transmit 20 bytes of information=1*53=53 bytes. The number of Ethernet bytes needed to transmit 20 bytes of information=20+22=42 bytes. As such, the overhead factor 'a' is a=53/42=1.26.

It should be noted that the overhead calculation analysis provided herein does not include additional overhead associated with encapsulating higher layer protocols. Overhead associated with the LLC encapsulation is 8 bytes while no overhead is associated with VC multiplexing encapsulation. For example, assuming LLC encapsulation, the formula for calculating $N_{cells}$ would change to $N_{cells}$=Ceiling((m+8+$h_{trailer}$)/48). The calculations are carried out in control plane (per connection), not for every frame. They are typically done in SW however they could also be completed by hardware or firmware configured to perform the appropriate functions.

Referring again to FIG. 10, data plane functions 171 include examining and mapping/setting the frame header information, forwarding the frame through the network, possible frame discard, and the like. The data plane functions are performed on every frame, typically in real-time. The control plane rules impact/configure the data plane functions 171, and are typically changed infrequently in non-real-time. The data plane functions can include, for example, MAC Address/VID mapping to/from VPI/VCI 172, CoS indicators 173, congestion information 174, discard eligibility 175 and frame length 176 and provide functions to support multiple CoS 177 (discussed below in detail).

With respect to MAC address/VID mapping function 172, referring back to FIG. 1B, interworking device 28 provides connection identification for frames sent from Ethernet network 26 to ATM network 30 and vice versa. For single CoS support, there is one-to-one mapping between an ATM connection and an Ethernet connection.

The Ethernet media access control (MAC) addresses are determined for frames delivered in the ATM to Ethernet direction. The source address (SA) and destination address (DA) in the media access control header may be determined by configuration, or automatically assigned/discovered by the network.

For frames traveling from the ATM network 30 to the Ethernet network 26, MAC source address may be set as the Ethernet interface address directly connected to the IWF. Alternatively, the IWF can dynamically assign an Ethernet address (which could change over a reset). The destination MAC address can be set by configuration based on the ATM VPI/VCI value in the ATM header. Alternatively, if the L3 payload is IP, the media access control destination address could be discovered. In that case, the IWF would determine the binding of the IP and media access control addresses on the Ethernet side, and an inverse address resolution protocol (invARP) query can be sent by the ATM device (e.g., CE Router) to the IWF. The invARP protocol request response returns the Ethernet customer edge router IP address.

For frames traveling from the Ethernet network 26 to the ATM network 30, there is no mapping of the MAC source address by the IWF 28. If the payload is IP, the Ethernet device (CE Router) can determine the IP address using an address resolution protocol (ARP) request (the IP address at the other end of the ATM VCC) and will expect a MAC (the MAC address of the Interworking function) address back in an ARP response, which it then places in the source Ethernet frame. The ATM VPI/VCI value could be restored based on configuration, or automatically discovered, for example by using ARP and inverse ARP and the CE router IP address.

Figure 15:
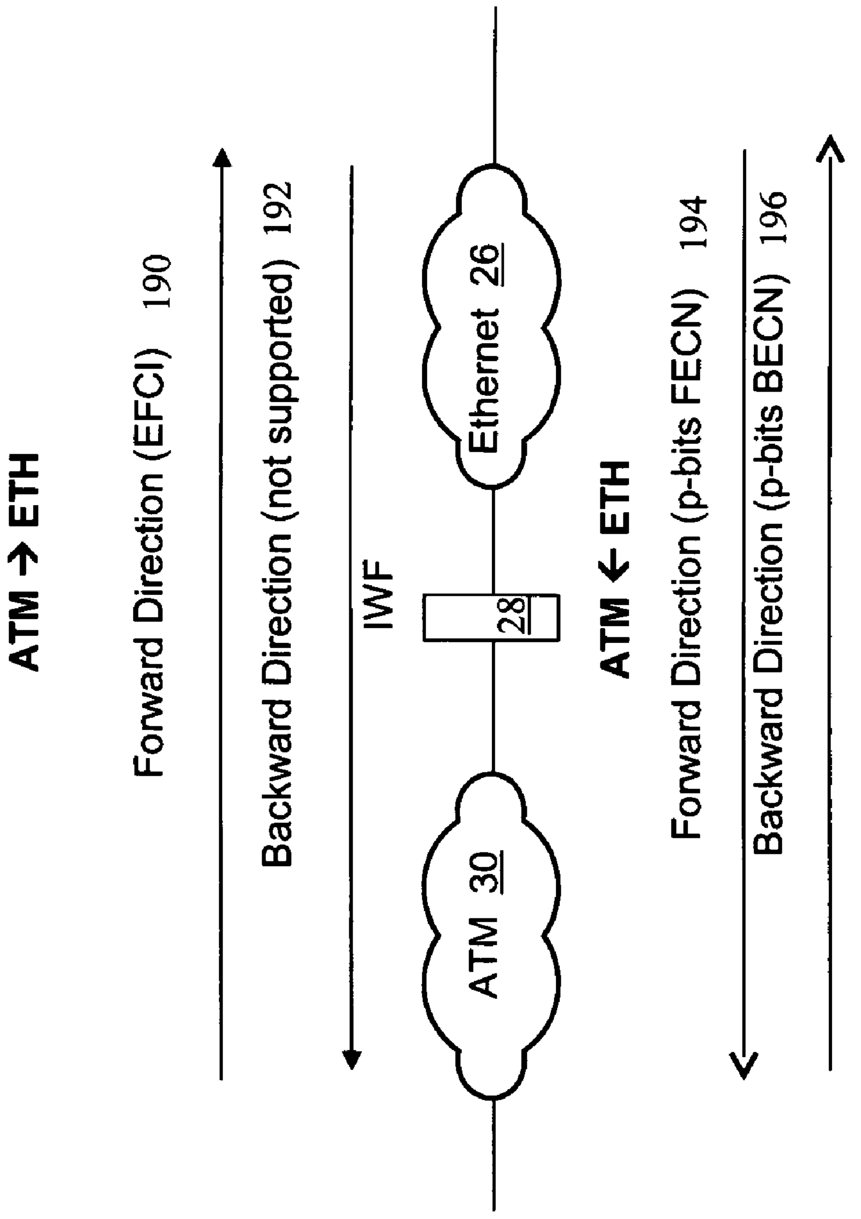
FIG. 15 is a block diagram showing congestion indications.

Referring to FIG. 15, a frame can include congestion indication options via congestion information function 174. ATM frames carry EFCI in the cell header. Mapping between the ATM network 30 and the Ethernet network 26 can be carried out, if the priority bits (p-bits) in a tagged Ethernet frame are assigned for carrying congestion information. Alternately or in addition, the congestion indication can be specified by the CFI field.

In the ATM to Ethernet direction, multiple options exist for mapping the EFCI bit. In a first option for mapping the EFCI field in the ATM frame to the Ethernet frame, if the EFCI field in the last cell of a received segmented frame is set to "congestion experienced", the IWF will set the p-bits FECN in the Ethernet frame to congestion experienced. In a second option, the EFCI is not mapped to Ethernet. For example, the EFCI value is neglected. This can occur when tagged Ethernet frames are not used or do not carry forward congestion information.

In the Ethernet to ATM direction, multiple options exist for mapping the frame forward congestion indications. In a first option for mapping, the forward congestion indication represented by a particular p-bits value is mapped to the EFCI field in all ATM cells that constitute the frame. In a second option, there is no mapping of p-bits, and the ATM FECI bit is always set to a fixed value determined by configuration. For the backward congestion indicator, the IWF ignores the value of the p-bits BECN in the received Ethernet frame.

Referring back to FIG. 10, discard eligibility function 175 indicates frames/cells to discard when the network is congested. Recall that the Ethernet PHB may indicate frame discard treatment. As another option, discard eligibility mapping can be restricted to tagged Ethernet frames which use the p-bits and/or the Ethernet CFI field. Although this option is more limited than use of the Ethernet PHB, it is simpler to implement, especially in the case where the incoming Ethernet frames do not use/support rich classification functions. Also, this option is independent of the ULP.

The discard eligibility indication is a measure of the frame importance within a service/flow. The frame can be marked by the user, or set by the network policer based on the traffic contract and user sending rate.

In the ATM to Ethernet direction, if one or more cells belonging to a frame has its CLP field set, the IWF will determine that the frame is discard eligible. This indication can be mapped to the Ethernet frame drop precedence indication if the p-bits are used for that purpose such that the discard eligibility bit can be mapped to one of the eight p-bits combinations, depending on Ethernet service definition (as described in "ETHERNET DIFFERENTIATED SERVICES" by Sameh Rabie, et. al U.S. patent application Ser. No. 10/868,536). Alternately, Ethernet frame discard eligibility (using p-bits) can be set to a constant indication based on a level of service for a particular provider configured at the time of subscription to the service.

In the Ethernet to ATM direction, discard eligibility mapping is applicable if tagged Ethernet frames include p-bits (or an equivalent mechanism) for discard eligibility indication. As one option, the Ethernet frame drop precedence is mapped to ATM CLP field. The PHB can indicate up to three drop precedences/colors. Metro Ethernet forum describes Ethernet frames as having a level of service indicated by a particular color. For example, green indicating conformant, yellow indicating excess, and red indicating traffic contract violation. The behaviors associated with the different colors can be mapped to particular discard eligibilities in the ATM frame. For example, for green Ethernet frames the IWF sets CLP bits in all of cells in the ATM frame to '0' and for yellow Ethernet frames the IWF sets CLP bits in all of cells in the ATM frame to '1'. Red frames are optionally dropped by the IWF or forwarded to the network with discard eligibility in ATM header set to '1'. As another option, the IWF sets the ATM CLP of every ATM cell generated by the segmentation process of the ML-5 PDU containing the information to a constant value (either '0' or '1') configured at service subscription time.

Another mappable data plane function shown in FIG. 10 is the frame length function 176. Frame length can also impact the forwarding treatment for the frame. The data field of the IEEE 802.3 frames is limited to 1518 bytes. 'Jumbo' frames can be larger than 1518 bytes on non-VLAN-aware interfaces and can be larger than 1522 bytes on VLAN-aware interfaces. Typically, jumbo frame can be up to approximately 9 K bytes. The IWF device drops ATM AAL-5 frames that exceed the maximum supported Ethernet length in the ATM to Ethernet direction. In the other direction, ATM AAL-5 standards specify Max, MTU as 65 K bytes, but different implementations and interfaces may support different values. For example, low-speed interfaces carrying multi-media traffic may have a smaller value. If the size of an Ethernet frame exceeds the ATM MTU the IWF drops the frame.

Multiple Classes of Service

Unlike standard ATM, a single Ethernet VLAN can support multiple CoS classes, for example premium, gold, and standard classes of services. Each class of service is identified by assigning a unique p-bit value to service frames. The EVC can be assigned a single bandwidth profile for the aggregate bandwidth for the whole EVC or be assigned multiple bandwidth profiles, i.e. a bandwidth profile for each service class or group of classes. The IWF of the present invention supports the various multiple CoS options and matches these options to the ATM transport capabilities.

In the Ethernet to ATM direction, each class of service can be assigned a separate ATM VCC based on the Ethernet interface, VLAN-ID, and/or p-bits value, a subset of the service classes can be mapped to a single ATM VCC based on Ethernet CoS indicators, or all service classes are mapped to a single frame-aware ATM VCC with Ethernet or IP awareness which can schedule AAL-5 frames into multiple queues depending on their CoS indication with frames interleaving. In the above options service and parameter mappings follow the same rules as described above.

In the ATM to Ethernet direction, the ATM side CoS can be determined any number of ways, such as from the VCC QoS, or L1-L7 classification of the assembled frame. In some ATM systems, the classification may not yield enough CoS granularity, in which case multiple or all ATM classes are combined on the Ethernet side.

The IWF is arranged to support the various multiple CoS options for the EVC and match them to the ATM transport capabilities. The following describes extensions to the control and data plane functions described above as applied for supporting multiple CoS EVCs.

In the Ethernet to ATM direction for the multiple CoS case, the Ethernet CoS indicators are used to indicate the frame service class. The IWF data plane functions perform service class mapping in addition to all of the single CoS mapping functions described above (see FIG. 10). The control plane functions can include mapping of the EVC and its bandwidth profile(s) to the corresponding ATM connection(s) and their parameters. The arrangement for the ATM to Ethernet direction is similar.

Figure 16A:
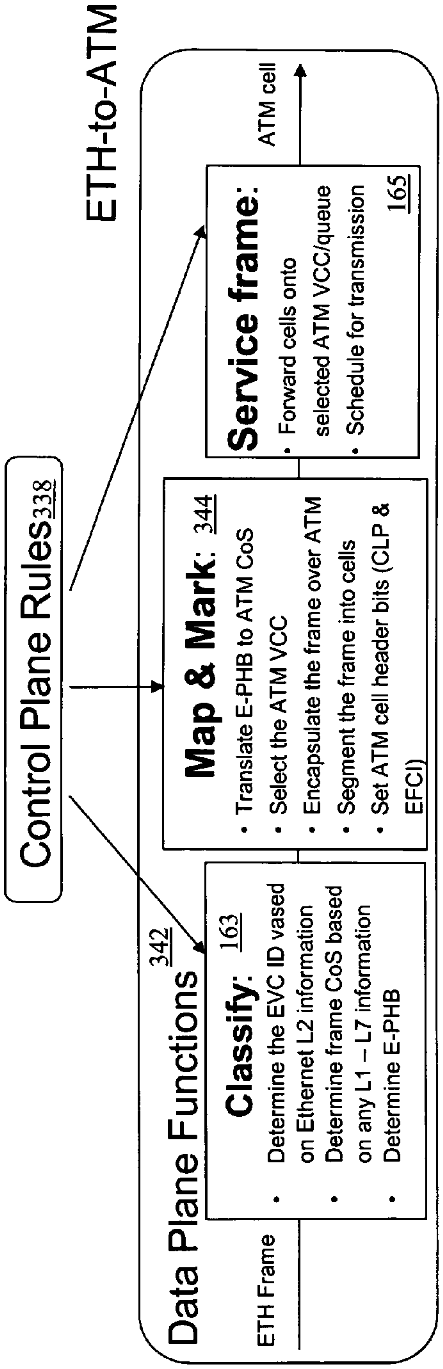
FIG. 16A is a diagram showing an exemplary typical service interworking process for multiple CoS implementations for frames being transported from an Ethernet network to an ATM network.
Figure 16B:
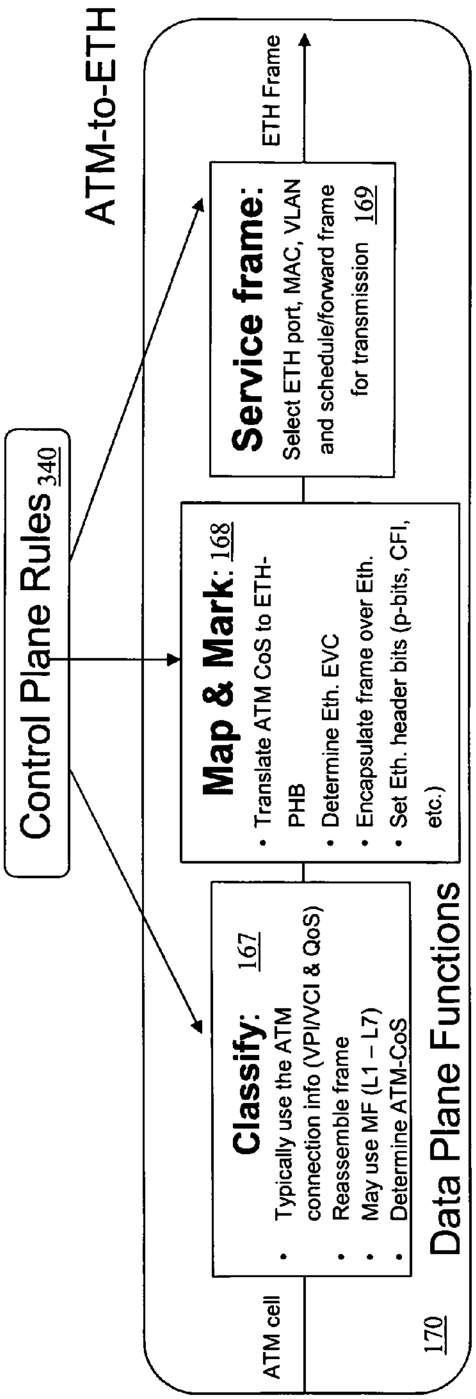
FIG. 16B is a diagram showing an exemplary typical service interworking process for multiple CoS implementations for frames being transported from an ATM network to an Ethernet network.

FIGS. 16A and B are diagrams showing an exemplary typical service interworking process for multiple CoS implementations. As shown in FIGS. 16A and B, much of the process is the same as for single CoS implementations. Control plane rules 338 and 340 in the IWF control data plane functions 342 and 170 in the Ethernet to ATM and ATM to Ethernet directions, respectively. In the Ethernet to ATM direction, the main difference from FIG. 9A and its description is the addition of an ATM VCC selection process in map and mark function 344.

With reference to FIG. 10, connection mapping function 179 for multiple CoS applications is described. For Ethernet EVC mapping to ATM, the EVC can be mapped to ATM using different methods depending on the extent of EVC CoS support, the ATM network capability and available CoS options. These options include (1) using a single legacy ATM VCC with a single CoS in the ATM network, (2) using multiple legacy ATM VCCs to support multiple CoS, and (3) using a single enhanced multi-CoS ATM VCC that is capable of supporting multiple CoS based on frame CoS indication such as the Ethernet P-bits or IP differentiated services.

Similar mapping can be implemented in the ATM to Ethernet direction. One or multiple ATM VCCs can be mapped to an Ethernet EVC. Parameter mappings depend on the number/CoS of the ATM VCCs and the EVC bandwidth parameter options. Based on these combinations, the ATM VCCs traffic may be aggregated or partitioned to the corresponding EVC traffic parameter sets. Parameter mappings are carried out for independently for each stream according to the single CoS mapping rules discussed above.

CoS frame mappings can use the VCC connection QoS in which case all VCC frames would receive the same scheduling treatment on the Ethernet side or use the frame CoS indicators such as P-bits, VID or IP DSCP in which case frames arriving on the same VCC could receive different Ethernet CoS treatment. In this case the IWF creates p-bits in the reverse (ATM to Ethernet) direction as well as a MAC address.

Figure 17:
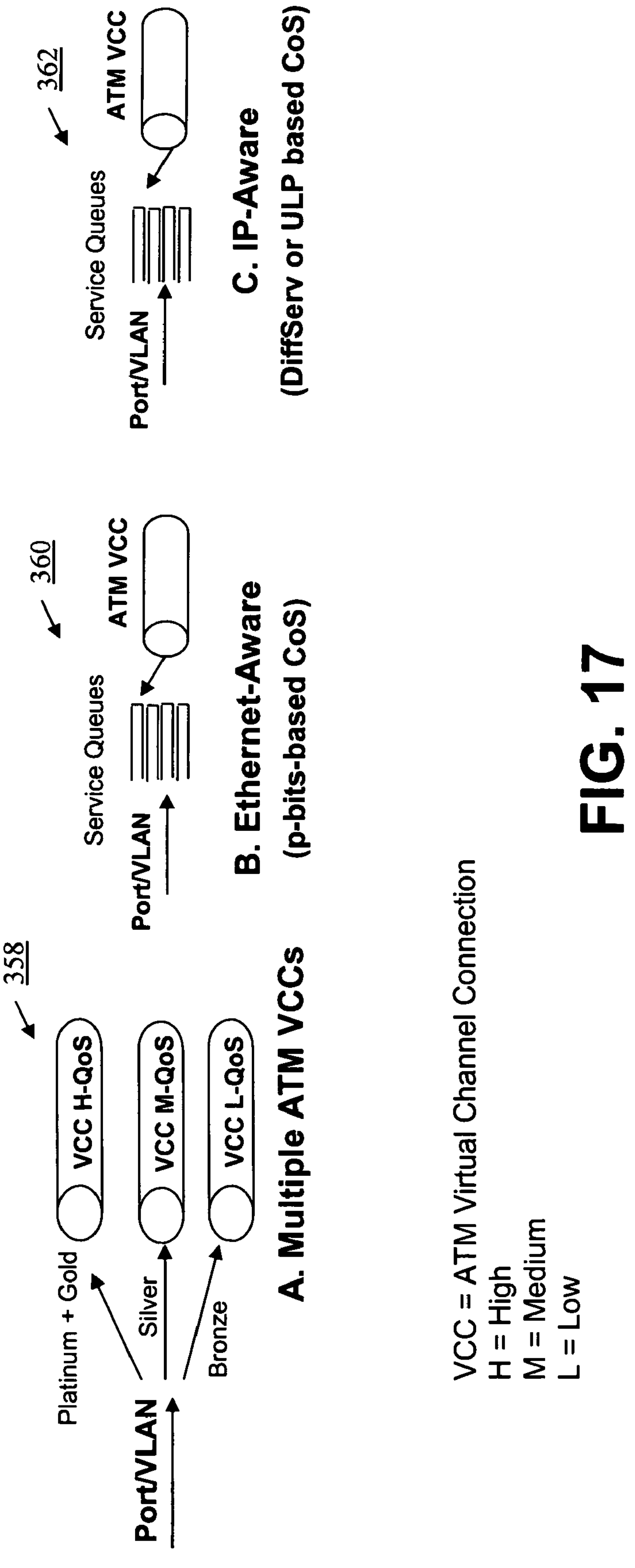
FIG. 17 is a diagram showing three examples of multiple CoS connection mapping.

FIG. 17 shows three examples of multiple CoS connection mapping. Example A 358 shows the case where multiple ATM VCCs can each support one or more Ethernet service classes by mapping a port/VLAN to a level of service for a VCC. Example B 360 shows the case where a single enhanced ATM VCC can be used in conjunction with service queues having p-bit awareness, i.e. p-bit arrangements are mapped to a VCC queue. Example C 362 uses a single ATM VCC in which the service queue has awareness of the ULP or IP differentiated service. In Example B 360 and Example C 362, traffic can potentially arrive out of order, but traffic of each service class would always arrive in order. A special class-based scheduler should be used in such a case to schedule the multiple service classes onto the single ATM VCC, without AAL-5 frames interleaving.

Figure 18:
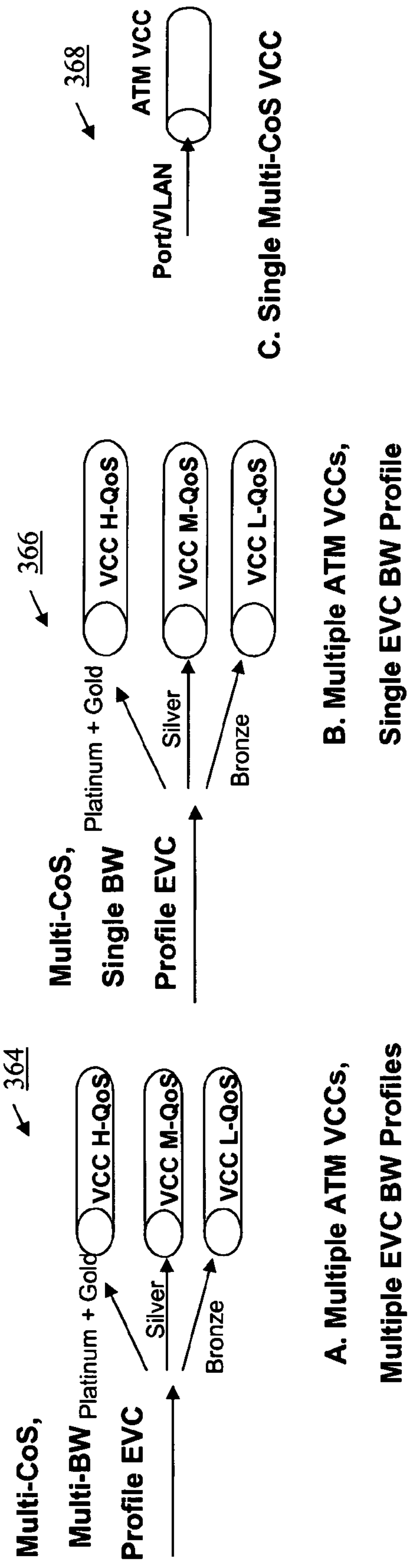
FIG. 18 is diagram showing three examples of bandwidth profile mapping in the Ethernet to ATM direction.

FIG. 18 shows three examples of bandwidth profile mapping in the Ethernet to ATM direction. In this arrangement, the bandwidth profile mapping will build on the parameter mappings and overhead calculations described above for single CoS EVC connections. Examples A 364 and B 366 are applicable when multiple VCCs are used. Example A 364 shows the case where multiple EVC profiles are used and each EVC bandwidth profile is mapped to a corresponding ATM VCC. Example B 366 shows the case where a single EVC bandwidth profile is supported by estimating the percentage of EVC traffic mapped to each ATM VCC. Single CoS parameter rules are applied separately to each EVC class/VCC pair.

Example C 368 shows the case where a single multi-CoS VCC is used. If there are multiple EVC bandwidth profiles, the EVC bandwidth profiles are aggregated before mapping to the ATM VCC bandwidth profile. If there is a single EVC bandwidth profile, the same rules as described above for the single CoS mapping are applied.

Data plane functions relating to frame processing are described in the case where multiple Ethernet services classes/CoS are supported by each EVC. When multiple VCCs are used, the Ethernet frame service class is used to select the outgoing ATM VCC in the Ethernet to ATM direction. As noted above, the Ethernet service class can be determined based on the Ethernet port, Ethernet header p-bits (and/or the CFI field), VID, and/or any protocol layer information such as IP addresses and DSCP.

In the Ethernet to ATM direction, control plane rules are used to determine the method of determining the Ethernet frame service class, the mapping rules from Ethernet to ATM service classes and the service classes associated with each ATM VCC. Each incoming frame is processed by (1) determining the Ethernet frame service class, (2) mapping the Ethernet service class to the closest ATM service class and (3) forwarding the frame onto the ATM VCC that supports the mapped ATM service class. In the ATM to Ethernet direction, a similar process is followed in reverse order. In addition, if multiple ATM connections are used per EVC, the incoming ATM VCC can be used to determine the frame CoS.

FIG. 19 shows an example of the flexibility provided by the present invention in mapping between Ethernet p-bits and ATM connections for different ATM connection QoS and CLP values. Table 370 shows an example where the Ethernet p-bits support five service classes, representing five forwarding classes, with some classes supporting multiple drop precedence values, and an ATM service that supports three services having various delay and loss guarantees. Although three ATM services are used in this example, it is contemplated that the present invention can be arranged to support any combination of ATM services and Ethernet service classes. In this example, the ATM CLP bit is used to represent drop precedence of the frames within a service class.

By way of example, row 372 shows the mapping of a "gold" Ethernet service class for an Ethernet PHB value of AF31, defined by p-bits value "110" to a real-time ATM service class assigned to ATM VCC ID 1, represented by ATM QoS CBR with the ATM CLP field set to "0".

The present invention advantageously provides a system, method and function for service interworking between Ethernet and ATM networks in a manner which maintains and supports class of service definitions from one network protocol to the other.

The present invention can be realized in hardware, software, or a combination of hardware and software. An implementation of the method and system of the present invention can be realized in a centralized fashion in one computing system, or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. An interworking device for supporting service interworking between an Ethernet communication network and an ATM network, the service interworking device comprising:

a first network interface operable to communicate with the Ethernet communication network using an Ethernet communication protocol;

a second network interface operable to communicate with the ATM communication network using an ATM protocol; and a processing unit in communication with the first network interface and the second network interface, the processing unit:

terminating frames received from a one of the ATM communication network and the Ethernet communication network;

mapping parameters corresponding to the received one of the ATM and Ethernet frames into the other of the ATM and Ethernet frames, the mapped parameters including connection configuration control plane information and data plane parameters corresponding to individual frames, the connection configuration control plane information including at least one of connection mapping information, class of service mapping information, and traffic parameters information;

determining a correction factor to map data rates between the Ethernet frames and the ATM frames; and using traffic parameters from one of the ATM and Ethernet networks to calculate traffic parameters for the other of the ATM and Ethernet networks.

2. The device according to claim 1 , wherein connection mapping information includes mapping Ethernet connection data to an ATM VCC.

3. The device according to claim 2, wherein Ethernet connection data includes an Ethernet virtual LAN identifier.

4. The device according to claim 1, wherein class of service mapping is used by the processing unit to maintain a desired QoS across the Ethernet and ATM networks.

5. The device according to claim 4, wherein the Ethernet network supports multiple classes of service, and wherein, for the Ethernet to ATM direction, an ATM VCC is assigned to each Ethernet class of service.

6. The device according to claim 4, wherein the Ethernet network supports multiple classes of service, and wherein, for the Ethernet to ATM direction, a separate ATM VCC is assigned to at least one Ethernet class of service based on one or more of a virtual LAN identifier, a p-bits value and the Ethernet interface upon which the frame was received.

7. The device according to claim 4, wherein for the ATM to Ethernet direction:

the Ethernet supports multiple classes of service;

the first network interface is a virtual LAN-aware interface; and a virtual LAN identifier is determined based on the ATM VCC value and a p-bits value is determined based on an ATM VCC service category.

8. The device according to claim 1, wherein data plane parameters corresponding to individual frames include at least one of MAC address/virtual LAN identifier mapping to/from an ATM VPI/VCI, class of service indicators, congestion information, discard eligibility and a frame length.

9. The device according to claim 8, wherein MAC address/virtual LAN identifier mapping to/from an ATM VPI/VCI includes mapping an ATM VPI/VCI to at least one of a virtual LAN identifier and a p-bits value and vice versa.

10. The device according to claim 8, wherein congestion information mapping includes mapping between an explicit forward congestion indication (EFCI) field in the ATM frame and a p-bits value in the Ethernet frame.

11. The device according to claim 8, wherein discard eligibility mapping includes mapping a cell loss priority (CLP) field in the ATM frame with a p-bits value in the Ethernet frame.

12. The device according to claim 8 wherein the discard eligibility mapping is based on an Ethernet per hop behavior.

13. The device according to claim 8, wherein the processing unit further drops ATM frames that exceed a maximum supported Ethernet frame length for frames traveling in the ATM to Ethernet direction and drops Ethernet frames that exceed a maximum supported ATM MTU for frames traveling in the Ethernet to ATM direction.

14. An interworking device for supporting service interworking between an Ethernet communication network and an ATM network, the service interworking device comprising:

a first network interface operable to communicate with the Ethernet communication network using an Ethernet communication protocol;

a second network interface operable to communicate with the ATM communication network using an ATM protocol; and a processing unit in communication with the first network interface and the second network interface, the processing unit:

terminating frames received from a one of the ATM communication network and the Ethernet communication network; and mapping parameters corresponding to the received one of the ATM and Ethernet frames into the other of the ATM and Ethernet frames, the mapped parameters including connection configuration control plane information and data plane parameters corresponding to individual frames, wherein mapping parameters corresponding to the received one of the ATM and Ethernet frames into the other of the ATM and Ethernet frames includes:

classifying parameters of a received frame;

mapping and marking the parameters of a received frame into a frame to be transmitted; and forwarding the frame to one of the first and second network interfaces for transmission.

15. A method for service interworking between an Ethernet communication network and an ATM network, the method comprising:

terminating frames received from a one of the ATM communication network and the Ethernet communication network; and mapping parameters corresponding to the received one of the ATM and Ethernet frames into the other of the ATM and Ethernet frames, the mapped parameters including connection configuration control plane information and data plane parameters corresponding to individual frames, the connection configuration control plane information including at least one of connection mapping information, class of service mapping information, and traffic parameters information;

determining a correction factor to map data rates between the Ethernet frames and the ATM frames; and using traffic parameters from one of the ATM and Ethernet networks to calculate traffic parameters for the other of the ATM and Ethernet networks.

16. The method according to claim 15, wherein connection mapping information includes mapping Ethernet connection data to an ATM VCC.

17. The method according to claim 16, wherein Ethernet connection data includes an Ethernet virtual LAN identifier.

18. The method according to claim 15, further comprising using the class of service mapping to maintain a desired QoS across the Ethernet and ATM networks.

19. The method according to claim 18, wherein the Ethernet network supports multiple classes of service, and wherein the method further comprises, for the Ethernet to ATM direction, assigning an ATM VCC to each Ethernet class of service.

20. The method according to claim 18, wherein the Ethernet network supports multiple classes of service, and wherein the method further comprises, for the Ethernet to ATM direction, assigning a separate ATM VCC to at least one Ethernet class of service based on one or more of a virtual LAN identifier, a p-bits value and the Ethernet interface upon which the frame was received.

21. The method according to claim 18, wherein for the ATM to Ethernet direction:

the Ethernet supports multiple classes of service;

the first network interface is a virtual LAN-aware interface; and the method further comprises:

determining a virtual LAN identifier based on the ATM VCC value; and determining a p-bits value based on an ATM VCC service category.

22. A method for service interworking between an Ethernet communication network and an ATM network, the method comprising:

terminating frames received from a one of the ATM communication network and the Ethernet communication network; and mapping parameters corresponding to the received one of the ATM and Ethernet frames into the other of the ATM and Ethernet frames, the mapped parameters including connection configuration control plane information and data plane parameters corresponding to individual frames;

wherein data plane parameters corresponding to individual frames include at least one of a MAC address/virtual LAN identifier mapping to/from an ATM VPI/VCI, class of service indicators, congestion information, discard eligibility and a frame length; and wherein discard eligibility mapping includes mapping a cell loss priority (CLP) field in the ATM frame with a p-bit in the Ethernet frame.

23. The method according to claim 22, wherein MAC address/virtual LAN identifier mapping to/from an ATM VPI/VCI includes mapping an ATM VPI/VCI to at least one of a virtual LAN identifier and a p-bits value and vice versa.

24. The method according to claim 22, wherein congestion information mapping includes mapping an explicit forward congestion indication (EFCI) field in the ATM frame with a p-bit in the Ethernet frame.

25. A method for service interworking between an Ethernet communication network and an ATM network, the method comprising:

terminating frames received from a one of the ATM communication network and the Ethernet communication network; and mapping parameters corresponding to the received one of the ATM and Ethernet frames into the other of the ATM and Ethernet frames, the mapped parameters including connection configuration control plane information and data plane parameters corresponding to individual frames, data plane parameters corresponding to individual frames including at least one of a MAC address/virtual LAN identifier mapping to/from an ATM VPI/VCI, class of service indicators, congestion information, discard eligibility and a frame length, wherein the discard eligibility mapping is based on an Ethernet per hop behavior.

26. A method for service interworking between an Ethernet communication network and an ATM network, the method comprising:

terminating frames received from a one of the ATM communication network and the Ethernet communication network; and mapping parameters corresponding to the received one of the ATM and Ethernet frames into the other of the ATM and Ethernet frames, the mapped parameters including connection configuration control plane information and data plane parameters corresponding to individual frames, data plane parameters corresponding to individual frames including at least one of a MAC address/virtual LAN identifier mapping to/from an ATM VPI/VCI, class of service indicators, congestion information, discard eligibility and a frame length; and dropping ATM frames that exceed a maximum supported Ethernet frame length for frames traveling in the ATM to Ethernet direction; and dropping Ethernet frames that exceed a maximum supported ATM MTU for frames traveling in the Ethernet to ATM direction.

27. A method for service interworking between an Ethernet communication network and an ATM network, the method comprising:

terminating frames received from a one of the ATM communication network and the Ethernet communication network; and mapping parameters corresponding to the received one of the ATM and Ethernet frames into the other of the ATM and Ethernet frames, the mapped parameters including connection configuration control plane information and data plane parameters corresponding to individual frames, wherein mapping parameters corresponding to the received one of the ATM and Ethernet frames into the other of the ATM and Ethernet frames includes:

classifying parameters of a received frame;

mapping and marking the parameters of a received frame into a frame to be transmitted; and forwarding the frame to one of the first and second network interfaces for transmission.

28. The method according to claim 15, further comprising performing interworking with a third communication network employing a networking technology other than Ethernet and ATM, the third communication network being coupled between the Ethernet communication network and the ATM communication network, wherein the service interworking is performed on one of the Ethernet side and the ATM side of the third communication network.

* * * * *